United States Patent
Gibson et al.

(10) Patent No.: US 9,552,592 B2
(45) Date of Patent: Jan. 24, 2017

(54) SYSTEM AND METHODS FOR UPCOMING EVENT NOTIFICATION AND MOBILE PURCHASING

(71) Applicant: STUBHUB, INC., San Francisco, CA (US)

(72) Inventors: Ashley Gibson, Pacifica, CA (US); Adam Debussy, Dublin, CA (US)

(73) Assignee: STUBHUB, INC., San Francisco, CA (US)

( * ) Notice: Subject to any disclaimer, the term of this patent is extended or adjusted under 35 U.S.C. 154(b) by 98 days.

(21) Appl. No.: 14/280,361

(22) Filed: May 16, 2014

(65) Prior Publication Data
US 2014/0257985 A1 Sep. 11, 2014

Related U.S. Application Data

(63) Continuation of application No. 12/262,468, filed on Oct. 31, 2008, now Pat. No. 8,731,526.

(51) Int. Cl.
*H04M 3/42* (2006.01)
*G06Q 30/02* (2012.01)
(Continued)

(52) U.S. Cl.
CPC ........ *G06Q 30/0258* (2013.01); *G06Q 20/045* (2013.01); *G06Q 20/32* (2013.01); *G06Q 20/3223* (2013.01); *H04W 4/12* (2013.01); *H04M 1/27455* (2013.01); *H04M 1/72552* (2013.01); *H04M 1/72561* (2013.01)

(58) Field of Classification Search
CPC ........... H04L 29/06; H04L 29/08; H04M 3/42; H04M 1/27455; H04M 1/72552; H04M 1/72561; G06Q 30/0251–30/0256; G06Q 30/02

USPC ....................................................... 455/414.3
See application file for complete search history.

(56) References Cited

U.S. PATENT DOCUMENTS

| | | | |
|---|---|---|---|
| 2004/0024682 A1* | 2/2004 | Popovitch .............. | G06Q 40/04 705/37 |
| 2008/0082922 A1* | 4/2008 | Biniak ............... | H04N 7/17318 715/719 |

(Continued)

OTHER PUBLICATIONS

Abhijit Kadlag et al."Supporting Exploratory Queries in Databases"; Department of Computer Science & Automation; Indian Institute of Science; Bangalore 560012, India; Y. Lee et al. (Eds.); DASFAA 2004, LNCS 2973, pp. 594-605; 2004.†

(Continued)

*Primary Examiner* — Huy C Ho
(74) *Attorney, Agent, or Firm* — Haynes and Boone, LLP

(57) ABSTRACT

Various embodiments relate generally to providing upcoming event notification and mobile purchasing and, more specifically but not exclusively relate to a system and methods for providing notifications of upcoming events to users of an online secondary ticket marketplace and allowing the users to purchase tickets to upcoming events using a mobile device. In one embodiment, a network-based system may receive a registration request from a user to receive alert notifications for upcoming events. The registration request may comprise a telephone number for a mobile device of the user. The network-based system may send an alert notification for an upcoming event to the mobile device of the user over a mobile telephone network. The alert notification may comprise a text message including relevant static or dynamic event information as well as an embedded hyperlink for allowing the user to transact a mobile purchase.

20 Claims, 6 Drawing Sheets

(51) Int. Cl.
*G06Q 20/04* (2012.01)
*G06Q 20/32* (2012.01)
*H04W 4/12* (2009.01)
*G06Q 30/00* (2012.01)
*H04M 3/493* (2006.01)
*H04M 1/2745* (2006.01)
*H04M 1/725* (2006.01)

(56) References Cited

U.S. PATENT DOCUMENTS

2008/0162211 A1\* 7/2008 Addington ............ G06Q 10/02
 705/14.5
2008/0244022 A1† 10/2008 Johnson

OTHER PUBLICATIONS

Apple iPhone Specifications; www.cnet.com/products/apple-iphone/specs/; CBS Interactive Inc.; 3 pages; released Jun. 29, 2007.†
Apple iPhone Specifications; www.cnet.com/products/apple-iphone/specs/; CBS Interactive, Inc.; 3 pages; released Jun. 29, 2007.†
Abhijit Kadlag et al; "Supporting Exploratory Queries in Databases"; Department of Computer Science & Automation; Indian Institute of Science; Bangalore 560012, India; Y. Lee et al. (Eds.): DASFAA 2004, LNCS 2973, pp. 594-605; 2004.†
iPhone User's Guide; http://pocketpccentral.net/pdfs/iPhone_User_Guide.pdf; 124 pages; copyright 2007 Apple Inc.†

\* cited by examiner
† cited by third party

Preference Center

*Contact Preferences*

My Alerts - *Send me important alerts tailored to my Interests and Ticketing Preferences (Edit interests below)*

- [✓] My Events      [✓] E-mail Alerts
- [ ] My Teams       [✓] SMS Text Message Alerts
- [ ] My Artists     [ ] MMS Message Alerts – *Includes Multimedia. Additional charges may apply.*
- [ ] My Venues

Interests and Ticketing Preferences

*Add or edit your interests and ticketing preferences so that we can deliver more relevant information to you.*

My Cities
[Add]

My Venues
[Add]

My Artists
[Add]

My Teams
[Add]

My Events
[Add]

1. Location: SF Bay Area ▼
2. Category: Sports ▼
3. From: mm/dd/yyyy    To: mm/dd/yyyy \# of Tickets: 2 ▼     $ Per Ticket: Under $25 ▼

[Search Events]

Event Listings

[✓] E-mail  [✓] SMS  ■ MMS    [Add Event]

*FIG. 3*

SYSTEM AND METHODS FOR UPCOMING EVENT NOTIFICATION AND MOBILE PURCHASING

CROSS REFERENCE TO RELATED APPLICATION

This application is a continuation of U.S. patent application Ser. No. 12/262,468, filed Oct. 31, 2008, which is incorporated herein by reference in its entirety.

BACKGROUND

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. For these reasons, sellers actively use the Internet to offer, sell and distribute a wide variety of goods to take advantage of the many benefits provided by the Internet and electronic commerce.

One example of a market for goods within the realm of electronic commerce is the secondary ticket market. The secondary ticket market encompasses all instances in which live event tickets trade after the original point of purchase. This market exists for several reasons. First, event tickets have an especially time-sensitive nature. Numerous tickets expire unused each year because there is no efficient mechanism to buy and/or sell secondary event tickets. When a ticket expires after an event has passed, it loses all of its intrinsic value. As a result, if the ticket holder cannot attend the event, the only way to realize value for a ticket is to sell it in the secondary market. For example, many venues, universities and/or sports franchises offer "season tickets" which are often packaged in bulk requiring a buyer to purchase several tickets at once. As a result, season ticket holders often possess a number of tickets for events that they cannot attend, and therefore desire to sell on the secondary market.

Additionally, event venues have only a fixed supply of seating. Therefore, the number of available tickets for a particular event is limited, which means that high-demand events can have significant volumes of secondary trading. Buyers, who would like to sit only in certain seat locations, further create a supply and demand imbalance. Particularly, each seat location in a venue is totally unique, which means there could be demand for a specific seat location that exceeds supply even when the venue is not sold out in the primary market, thereby favoring the secondary market. Moreover, while tickets for certain events (e.g., football games of a team in the same venue) may be similarly priced, the actual supply and demand for such events may be substantially different, thereby favoring the secondary market.

StubHub provides a network-based system which implements an online secondary ticket marketplace for buyers and sellers of tickets for live events such as sports, concerts, theater, and other entertainment events. The StubHub online secondary ticket marketplace enables legitimate, convenient, reliable, and secure transactions at fair market value and provides ticket fulfillment services, even for "sold out" events. Accordingly, the StubHub online secondary ticket marketplace provides benefits for fans who wish to buy, sell or otherwise transfer secondary tickets as well as for teams, artists, and venues.

SUMMARY

Various embodiments relate generally to providing upcoming event notification and mobile purchasing and, more specifically but not exclusively relate to a system and methods for providing notifications of upcoming events to users of an online secondary ticket marketplace and allowing the users to purchase tickets to upcoming events using a mobile device. In one embodiment, a network-based system may receive a registration request from a user to receive alert notifications for upcoming events. The registration request may comprise a telephone number for a mobile device of the user. The network-based system may send an alert notification for an upcoming event to the mobile device of the user over a mobile telephone network. The alert notification may comprise a text message including relevant static or dynamic event information as well as an embedded hyperlink for allowing the user to transact a mobile purchase. The hyperlink may comprise a hyperlinked telephone number for allowing the user to place a telephone call to an agent of the network-based system for transacting the mobile purchase. Alternatively or additionally, the hyperlink may comprise a uniform resource locator (URL) or a uniform resource identifier (URI) for navigating to the network-based system for transacting the mobile purchase. Other embodiments are described and claimed.

BRIEF DESCRIPTION OF THE DRAWINGS

The foregoing aspects and many of the attendant advantages of various embodiments will become more readily appreciated and better understood by reference to the following detailed description and the accompanying drawings.

FIG. 3 illustrates a representation of a web page hosted by the network-based system for providing online marketplace and ticket fulfillment services in accordance with various embodiments.

DETAILED DESCRIPTION

Various embodiments are described for providing users of a online secondary ticket marketplace with the ability to receive upcoming event notifications and to purchase goods such as event tickets using a mobile device. Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
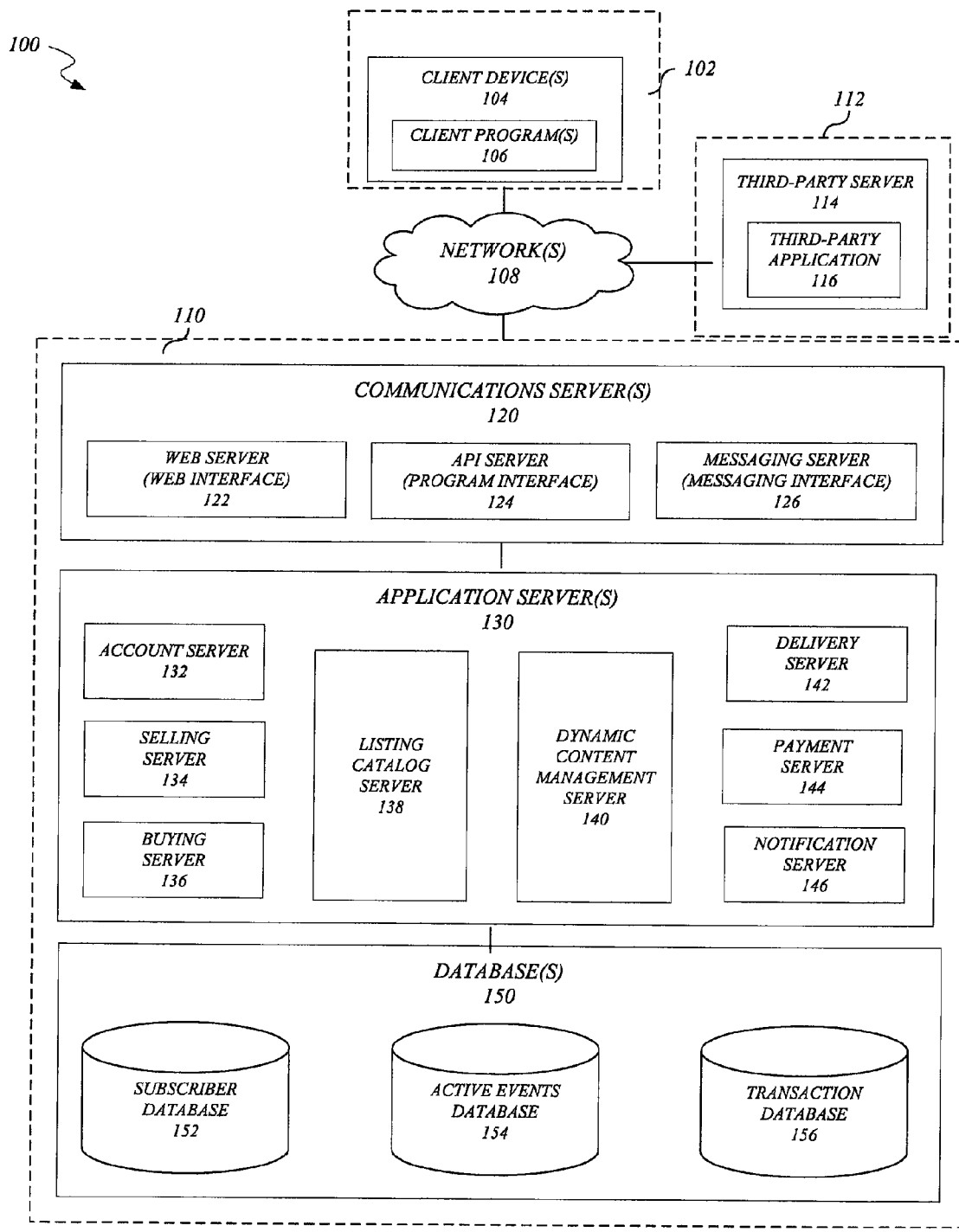
FIG. 1 illustrates an exemplary communications system including a network-based system for providing online marketplace and ticket fulfillment services in accordance with various embodiments.

FIG. 1 illustrates a communications network-based system 110 suitable for implementing various embodiments. The elements of the communications network-based system 110 generally may comprise physical or logical entities for communicating information and, in some cases, may be implemented as hardware, software, or combination thereof, as desired for a given set of design parameters or performance constraints. Although FIG. 1 includes a limited number of elements for purposes of illustration, it can be appreciated that the communications network-based system 110 may include more or less elements as well as other types of elements.

Various elements of the communications network-based system 110 may be implemented utilizing one or more computing devices having computing and/or communications capabilities in accordance with the described embodiments. Exemplary computing devices may include, without limitation, a mobile device, a personal digital assistant (PDA), a mobile computing device, a communications device, a telephone, a mobile telephone, a cellular telephone, a smart phone, a handset, a one-way pager, a two-way pager, a messaging device, a computer, a personal computer (PC), a desktop computer, a work station, a laptop computer, a notebook computer, a tablet computer, a handheld computer, a mini-computer, a network appliance, a web appliance, a server, a server computer, a server array, a server farm, an Internet server, a web server, a network server, a main frame computer, a supercomputer, a distributed computing system, multiprocessor system, processor-based systems, a control system, consumer electronic equipment, a media device, a gaming device, a television, a digital television, a set-top box (STB), wireless access point, base station, subscriber station, mobile subscriber center, radio network controller, a network access device, a telephone network device, a mobile telephone network device, a VoIP network device, a radio network device, a television network device, a satellite network device, a router, a hub, a gateway, a bridge, a switch, a machine, or combination thereof.

The computing devices utilized by the communications network-based system 110 may be implemented by various hardware and/or software components in accordance with the described embodiments. Exemplary hardware components may include processing devices such as central processing unit (CPU) and/or other processors, microprocessors, application processors, radio processors, baseband processors, digital signal processors (DSP), circuits, circuit elements (e.g., transistors, resistors, capacitors, inductors, and so forth), integrated circuits, application specific integrated circuits (ASIC), programmable logic devices (PLD), a field programmable gate array (FPGA), logic gates, registers, semiconductor device, chips, microchips, chip sets, memory such as volatile and/or non-volatile memory, a display such as a liquid crystal display (LCD) or cathode ray tube (CRT), input devices such a keyboard, mouse, stylus, touch pad, and/or touch screen, networking devices such as ports, network interface cards (NICs), transmitters, receivers, transceivers, and/or antennas, as well as other components. Exemplary software components may include computer programs, applications, application programs, system programs, operating system (OS) software, middleware, firmware, a software interface, a programmatic interface, an application program interfaces (API), a network interface, a web interface, a messaging interface, modules, instruction sets, routines, subroutines, functions, calls, computing code, or combination thereof.

Various elements of the communications network-based system 110 may support wired and/or wireless communications functionality in accordance with the described embodiments. For example, some computing devices may be arranged to communicate information over one or more types of communication links such as a wire, cable, bus, printed circuit board (PCB), backplane, switch fabric, semiconductor material, twisted-pair wire, co-axial cable, fiber optic connection, Ethernet connection, peer-to-peer (P2P) connection, a data channel, a radio channel, a satellite channel, a television channel, a broadcast channel, an infrared (IR) channel, a radio-frequency (RF) channel, a portion of the RF spectrum, one or more licensed or license-free frequency bands, and so forth.

Various elements of the communications network-based system 110 may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV, CDMA/1xRTT, GSM/GPRS, EDGE, HSDPA, HSUPA, and others.

Computing devices and networks may support wireless local area network (WLAN) and/or wireless metropolitan are network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, near-field communication, electro-magnetic induction (EMI) communication, passive or active RFID communication, micro-impulse radar (MIR), ultra-wide band (UWB) communication, automatic identification and data capture (AIDC) communication, and others.

Further aspects and advantages of various embodiments will become more readily appreciated and better understood by the following description of the elements of the communications network-based system 110 illustrated in FIG. 1. Although certain exemplary embodiments and implementations may be illustrated and described as comprising a particular combination of elements and performing a particular set of operations, it is to be understood that the principles and techniques discussed herein are not limited to such examples.

In the embodiment shown in FIG. 1, the communications network-based system 110 includes, among other elements, a client 102 which may comprise or employ one or more client devices 104 such as a mobile computing device, a PC, and/or any other computing device having computing and/or communications capabilities in accordance with the described embodiments. The client devices 104 generally may provide one or more client programs 106 such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Runtime Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. In some usage scenarios, one or more of the client programs 106 may display various graphical user interfaces (GUIs) to present information to and/or receive information from one or more of the client devices 104.

As shown, the client 102 is communicatively coupled via one or more networks 108 to a network-based system 110. The network-based system 110 may be structured, arranged, and/or configured to allow the client 102 to establish one or more communications sessions with the network-based system 110 using various computing devices 104 and/or client programs 106. Accordingly, a communications session between the client 102 and the network-based system 110 may involve the unidirectional and/or bidirectional exchange of information and may occur over one or more types of networks 108 depending on the mode of communication. While the embodiment of FIG. 1 illustrates the communications network-based system 110 deployed in a client-server operating environment, it is to be understood that other suitable operating environments and/or architectures may be used in accordance with the described embodiments.

Data and/or voice communications between the client 102 and the network-based system 110 may be sent and received over one or more networks 108 such as the Internet, a WAN, a WWAN, a WLAN, a mobile telephone network, a landline telephone network, a VoIP network, as well as other suitable networks. For example, the client 102 may communicate with the network-based system 110 over the Internet or other suitable WAN by sending and or receiving information via interaction with a web site, e-mail, IM session, and/or video messaging session. The client 102 also may communicate with the network-based system 110 via a telephone call to a customer service agent and/or interactive voice response (IVR) system made over a mobile telephone network, a landline network, and/or a VoIP network. In wireless implementations, the client 102 may communicate with the network-based system 110 over the Internet via a WLAN or mobile telephone network that supports WWAN communications services. The client 102 also may communicate over a mobile telephone network via SMS and/or MMS messaging. It is to be appreciated that the embodiments are not limited in this regard.

In various usage scenarios, communication sessions and/or messaging between the client 102 and the network-based system 110 may involve multiple modes of communication and/or multiple networks. In some cases, for example, the client 102 may initiate communication with the network-based system 110 by interacting with a web site. In response, the network-based system 110 may communicate with the client 102 in a variety of ways such as via the web site, e-mail, IM, SMS, MMS, and/or a telephone call from a customer service agent and/or IVR system. The communication from the network-based system 110 may comprise a message (e.g., e-mail, IM, SMS, MMS) containing relevant static or dynamic content, an embedded hyperlinked URL for directing the client 102 to a web site, and/or a hyperlinked telephone number for allowing the client 102 to click and place a telephone call to an agent (e.g., customer service agent and/or IVR system) of the network-based system 110.

When communicating with the network-based system 110, the client 102 may employ one or more client devices 104 and/or client programs 106. In various implementations, the client devices 104 and/or client programs 106 may host or provide one or more interfaces for communicating with the network-based system 110. Exemplary interfaces may include a web interface, an API interface, a messaging interface, and/or other suitable communication interface in accordance with the described embodiments. The client programs 106 for communicating with the network-based system 110 may comprise, for example, pre-installed, authored, downloaded, and/or web-based computer programs.

The client programs 106 provided by one or more of the client devices 104 (e.g., mobile computing device and/or PC) may include a web client. The web client may comprise, for example, a desktop and/or mobile (e.g., WAP) web browser (e.g., Internet Explorer®, Mozilla®, Firefox®, Safari®, Opera®, Netscape Navigator®, etc.) capable of rendering web pages (e.g., HTML documents) and supporting various browser-based web technologies and programming languages such as HTML, XHTML, CSS, Document Object Model (DOM), XML, XSLT, XMLHttpRequestObject, JavaScript, ECMAScript, Jscript, Ajax, Flash®, Silverlight™, Visual Basic® (VB), VB Scripting Edition (VBScript), PHP, ASP, Java®, Shockwave®, Python, Perl®, C#/.net, and/or others.

In some embodiments, the web client may comprise or be implemented as a web-based application, web-based interpreter, and/or virtual machine for requesting, receiving, presenting, and/or updating content hosted by the network-based system 110. In such embodiments, the web client may employ various programming languages (e.g., interpreted, compiled, scripting, virtual machine, etc.) and/or may comprise an API implementation in accordance with a software development kit (SDK) provided by the network-based system 110.

In various usage scenarios, the client 102 may use a web client to provide an interface (e.g., HTTP interface) for navigating to a web site associated with the network-based system 110 and for requesting and receiving web page data from the network-based system 110. For example, the client 102 may use the web client to navigate to a web site associated with the network-based system 110 by entering a URL into a web browser address bar and/or by clicking on a hyperlinked URL delivered to the client 102 via a web page, web-based application, e-mail, IM, SMS, MMS, and/or other delivery mechanism.

In one or more embodiments, the web client may comprise or be implemented as a web browser toolbar for communicating with the network-based system 110. In such embodiments, the web browser toolbar may include, for example, a button (e.g., dedicated, customized, add-on) and/or a hyperlinked URL for navigating to a web site associated with the network-based system 110. The web browser toolbar also may implement enhanced features such as a search engine interface (e.g., text entry box, input fields, checkboxes, clickable hyperlinks) and/or one or more pull-down menus for accessing the network-based system 110, sending information (e.g., search query, keywords, user preferences, menu selections) to the network-based system 110, and/or receiving information (e.g., search results, relevant static or dynamic content) from the network-based system 110.

In one or more embodiments, the web client may comprise or be implemented as a widget such as a desktop or mobile widget for communicating with the network-based system 110. In such embodiments, the desktop or mobile widget may comprise web-based code, an interpreter, a virtual machine, and/or an API implementation to request, receive, present, and/or update content hosted by the network-based system 110. The desktop or mobile widget may comprise, for example, a client-side web application displayed on the desktop or phone-top of one or more of the client devices 104 implemented using various web technologies and programming languages. In various implementations, the desktop or mobile widget may be supported by a host runtime environment such as a web browser or suitable rendering engine and/or may be installed and run as a stand-alone application outside of a web browser.

As shown in FIG. 1, the communications network-based system 110 includes, among other elements, a third party 112 which may comprise or employ a third-party server 114 hosting a third-party application 116. In various implementations, the third-party server 114 and/or third-party application 116 may host a web site associated with or employed by a third party 112 such as an affiliate, partner, or other third-party entity or user in accordance with the described embodiments. It can be appreciated that, in some implementations, the third party 112 may provide the third-party application 116 for promoting, enhancing, complementing, supplementing, and/or substituting for one more services provided by the network-based system 110. For example, the third-party server 114 and/or third-party application 116 may enable the network-based system 110 to provide the client 102 with additional services and/or information.

In some usage scenarios, one or more of the client programs 106 may be used to access the network-based system 110 via the third party 112. For example, the client 102 may use a web client to access and/or receive content from the network-based system 110 after initially communicating with a third-party web site. The web site of the third party 112 (e.g., affiliate, partner) may comprise, for example, a hyperlinked advertisement, a web widget, and/or an API implementation comprising web-based code within a web page to present static or dynamic content hosted by the network-based system 110 and/or to provide programmatic access to the network-based system 110.

It can be appreciated that the hyperlinked advertisement, web widget, and/or API implementation for communicating with the network-based system 110 may be hosted by various third-party web sites such as an affiliate web site, a partner web site, an online marketplace web site, an entertainment web site, a sports web site, a media web site, a search engine web site, a social networking web site, a blog, and/or any other corporate or personal web site or web page in accordance with the described embodiments. In some cases, the third party 112 may be directly or indirectly compensated for directing traffic from the third-party web site to the web site of the network-based system 110 and/or in the event that an electronic commerce transaction results after a user is directed from the third-party web sites to the web site of the network-based system 110.

The client programs 106 executed by one or more of the client devices 104 may include a programmatic client for accessing and communicating with the network-based system 110. Along with performing a certain set of functions, the programmatic client may include, for example, an implementation of an API provided by the network-based system 110 for enabling access to and/or communication with various elements (e.g., servers, databases) of the network-based system 110. In various embodiments, the API implementation may comprise executable code in accordance with an SDK provided by the network-based system 110.

In some usage scenarios, the programmatic client may be implemented as a stand-alone or web-based database, point-of-sale (POS), and/or inventory management application for managing a large volume of available inventory and communicating with the network-based system 110. The programmatic client may be employed, for example, by high-volume sellers to author, update, and manage a large number of inventory listings. In some cases, a high-volume seller may use the programmatic client to perform batch-mode communication with the network-based system 110. The batch-mode communication from the high-volume seller may comprise data for numerous inventory items (e.g., hundreds, thousands) for publication by the network-based system 110. The programmatic client also may be used to communicate with the network-based systems in real-time. For example, communications from the high-volume seller may comprise real-time inventory updates so that the listings published by the network-based system 110 accurately reflect the available inventory of the high-volume seller.

The client programs 106 executed by one or more of the client devices 104 (e.g., mobile computing device and/or PC) also may include a messaging client. The messaging client may comprise, for example, an application that supports one or more modes of communication such as e-mail, IM, SMS, MMS, telephone, VoIP, video messaging, and so forth. It can be appreciated that some messaging clients may required and/or launch an Internet connection in the background when executed.

In accordance with various embodiments, the network-based system 110 may communicate with and provide services to users such as buyers and/or sellers of goods such as event tickets on a secondary market. For example, the network-based system 110 may comprise or implement an online secondary ticket marketplace for buyers and sellers of tickets for live events such as sports, concerts, theater, and other entertainment events.

It is to be appreciated that goods for purchase and/or sale may include both tangible goods (e.g., physical tickets, electronic tickets), intangible goods (e.g., rights and/or licenses that are afforded by the tickets), and other goods in accordance with the described embodiments. It also is to be appreciated that users other than buyers and/or sellers may communicate with the network-based system 110. In some cases, for example, the client 102 may be associated with an administrator or customer service agent and may communicate with the network-based system 110 to monitor, update, and/or otherwise manage one or more computing devices and/or services of the network-based system 110.

FIG. 1 illustrates an exemplary embodiment of the network-based system 110 for providing online secondary ticket marketplace. As shown, the network-based system 110 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers.

In various implementations, the servers of the network-based system 110 may comprise or implement software components deployed in a tiered environment, where one or more servers are used to host server software running in each tier. For example, using a three-tiered architecture, one or more server software components may be hosted by front-end servers, one more server software components may be hosted by a middle tier or middleware implemented by application servers, and one more server software components may be hosted by a back-end tier implemented by databases and/or file systems. In some embodiments, servers of the network-based system 110 may be communicatively coupled with each other via a local area network (LAN) and/or suitable intranet or back-end network.

The network-based system 110 may comprise one or more communications servers 120 for providing suitable interfaces to enable communication using various modes of communication and/or via one or more networks 108. In the embodiment of FIG. 1, the communications servers 112 include a web server 122, an API server 124, and a messaging server 126 to provide interfaces to one or more application servers 130. The application servers 130 of the network-based system 110 may be structured, arranged, and/or configured to provide various online marketplace and/or ticket fulfillment services to users that access the network-based system 110.

In various usage scenarios, the client 102 may communicate with the applications servers 130 of the network-based system 110 via one or more of a web interface provided by the web server 122, a programmatic interface provided by the API server 124, and a messaging interface provided by the messaging server 126. It can be appreciated that the web server 122, the API server 124, and the messaging server 126 may be structured, arranged, and/or configured to communicate with various types of client devices 104 and/or client programs 106 and may interoperate with each other in some implementations.

The web server 122 may be arranged to host web pages (e.g., HTML documents) and provide an appropriate web interface (e.g., HTTP, CGI, etc.) for enabling data to be presented to and received from entities via the Internet. The web server 122 may be arranged to communicate with web clients and/or applications such as a web browser, web browser toolbar, desktop widget, mobile widget, web-based application, web-based interpreter, virtual machine, and so forth. The web server 122 may provide a web interface to enable access by the client 102 and/or the third party 112 to the various services and functions provided by the application servers 130. For example, the web server 122 may be arranged to receive data from the client 102 and/or third party 112 and to pass the data to one or more application servers 130 within the network-based system 110. The web sever 122 also may present the client 102 and/or third party 112 with relevant static and dynamic content hosted by the network-based system 110 in response to various requests and/or events.

The API server 124 may be arranged to communicate with various client programs 106 and/or a third-party application 116 (e.g., third-party web site) comprising an implementation of API for the network-based system 110. The API server 124 may provide a programmatic interface to enable access by the client 102 and/or the third party 112 to the various services and functions provided by the application servers 130. For example, the programmatic interface provided by the API server 124 may be used for batch-mode and/or real-time communication with a high-volume seller for receiving and updating inventory listings. The programmatic interface provided by the API server 124 also may be used to communicate relevant static or dynamic content hosted by the network-based system 110 to an API implementation of one or more client programs 106 and/or a third-party application 116 (e.g., third-party web site). The API implementation may comprise, for example, executable code in accordance with a SDK provided by the network-based system 110.

The messaging server 126 may be arranged to communicate with various messaging clients and/or applications such as e-mail, IM, SMS, MMS, telephone, VoIP, video messaging, and so forth. The messaging server 126 may provide a messaging interface to enable access by the client 102 and/or the third party 112 to the various services and functions provided by the application servers 130. For example, the messaging interface provided by the messaging server 126 may be used to communicate with the client 102 and/or the third party 112 in a variety of ways such as via e-mail, IM, SMS, MMS, video messaging, and/or a telephone call (e.g., landline, mobile, VoIP) with a customer service agent and/or IVR system.

When implemented as an online secondary ticket marketplace, the application servers 130 of the network-based system 110 may provide various online marketplace and ticket fulfillment services including, for example, account services, buying services, selling services, listing catalog services, dynamic content management services, delivery services, payment services, and notification services. In the exemplary embodiment shown in FIG. 1, the application servers 130 may comprise an account server 132, a buying server 134, a selling server 136, a listing catalog server 138, a dynamic content management server 140, a delivery server 142, a payment server 144, and a notification server 146, structured and arranged to provide such online marketplace and ticket fulfillment services.

The application servers 130, in turn, may be coupled to and capable of accessing one or more databases 150 including a subscriber database 152, an active events database 154, and a transaction database 156. The databases 150 generally may store and maintain various types of information for use by the application servers 130 and may comprise or be implemented by various types of computer storage devices (e.g., servers, memory) and/or database structures (e.g., relational, object-oriented, hierarchical, dimensional, network) in accordance with the described embodiments.

Account Services

The account server 132 implemented by one or more of the application servers 130 may allow a user to establish and/or manage a subscriber account with the network-based system 110. For example, while some services provided by the network-based system 110 may be generally accessible, a user may be required access an existing subscriber account or register a new subscriber account with the network-based system 110 in order to receive certain customized and/or subscriber-specific services.

To create a subscriber account, a user may provide the network-based system 110 with account information such as a unique username, e-mail address, password, name, location (e.g., address, city, country, and/or zip code), telephone numbers (e.g., home, work, and/or mobile), and/or other required information for identifying and/or authenticating the user. After receiving the required account information and instructions from the user to create the subscriber account, the network-based system 110 may create the subscriber account and store the account information in the subscriber database 152.

After a subscriber account is created, the user may view and/or make changes to account information, add or edit existing contacts, retrieve or change the password, view and edit sources of funds and/or financial value on file, view and edit payment options, and/or otherwise manage the subscriber account.

To effectuate the buying or selling of goods such as event tickets, the user may be required to link the subscriber account of to a source of funds and/or financial value for completing different transactions via the network-based system 110. It can be appreciated that the user may provide various types of entities or third-party financial accounts capable of supplying or receiving funds and/or financial value in accordance with the described embodiments. Exemplary entities and/or third-party financial accounts may include, without limitation, a bank, bank account, lender, line-of-credit, credit card company, credit card account, debit card, prepaid debit card account, third-party payment services account (e.g., PayPal™ account), payroll account, check, money order, or any other suitable source of financial value.

Additionally or alternatively to linking the subscriber account to a source of financial value based on a commercial currency (e.g., U.S. dollar), a user may link to the subscriber account to a source of financial value based on a proprietary and/or promotional currency (e.g., points, rewards, coupons) capable of accumulation and/or redemption by the user to pay for goods or services. It can be appreciated that multiple sources of funds and/or financial value associated with the user may be linked to the subscriber account enabling the user to select among such sources to effectuate different payment transactions via the network-based system 110.

The user may select various options for receiving payment when a sale is effectuated via the network-based system 110. For example, the user may request payment for sales via check, deposit to a third-party payment services account (e.g., PayPal™ account) or Season Ticket Account, and/or other type of source capable of receiving funds and/or financial value in accordance with the described embodiments. In some implementations, the user may select to donate some or all of the proceeds of a sale to a third-party such as a non-profit organization or entity (e.g., charity, foundation, fund, alliance, society) as described in co-pending U.S. patent application Ser. No. 10/697,850 titled "System and Method for Providing Logistics for a Sale or Transfer of Goods with Proceeds Provided to a Third Party," which was filed on Oct. 30, 2003 and is incorporated by reference in its entirety.

When accessing the subscriber account, the user may view and/or manage various details of past and pending transactions. For example, the subscriber account may provide a seller with details regarding past and pending ticket sale listings (e.g., shipped, canceled, inactive, expired, deleted, active, pending confirmation, awaiting shipment) and may allow the user to track event listings, modify the prices of event listings, view and confirm received orders, view and confirm orders to ship, print or reprint shipping labels, view shipped orders, view canceled orders, view the status of payments and edit payment options, view past payments, and so forth. The subscriber account also may provide a buyer with details regarding past and pending ticket purchase transactions (e.g., past orders, purchased, delivered, canceled, expired, order status, delivery status, active bids, auctions lost) and may allow the user to view order history, track active bids, modify offers, download and print electronic tickets, view and edit payment options, and so forth.

In various implementations, the user may customize a subscriber account with one or more interests and ticketing preferences. For example, the user may add and edit information associated with the subscriber account regarding one or more cities, venues, artists, teams and sporting events, theaters, and season ticket and packages of interest to the user.

The user also may customize a subscriber account with one or more notification preferences. For example, the user may configure the subscriber account to receive notifications, change notifications, and/or discontinue notifications. In some cases, the user may request to receive promotions via an e-mail newsletter featuring events happening in a particular location.

In accordance with various embodiments, the user may subscribe to receive customized alert notifications in a variety of ways such as via e-mail, IM, SMS, MMS, and/or other suitable delivery mechanism. In addition to receiving such notifications via e-mail, IM, SMS, MMS, the user may access the subscriber account and view recent notifications such as alert notifications and other messages received in the past week. Further details of such embodiments are provided in greater detail below with reference to FIGS. 2-8.

Selling Services

The selling server 134 implemented by one or more of the application servers 130 may allow a user to offer goods for sale via an online marketplace provided by the network-based system 110. To list goods for sale such as a single or multiple event tickets, a seller may provide the network-based system 110 with required event information such as event, location of the tickets, sale type, ticket quantity, seating details (e.g., section, row, seat, comments), price, and payment method. After receiving the required event information and instructions from the seller to publish an event listing, the network-based system 110 may create an active event and store the event information in the active events database 154 for publication to users of the network-based system 110. It can be appreciated that upon the sale of the tickets, one or more delivery options may be available depending on the locations of the buyer and the seller, the time remaining before the event, and/or the form of the tickets (e.g., physical tickets, electronic tickets).

In various embodiments, a seller may post an event for publication as described in co-pending U.S. patent application Ser. No. 11/689,787 titled "System and Method for Posting Multiple Items for Sale," which was filed on Mar. 22, 2007 and is incorporated by reference in its entirety. In such embodiments, the seller may select the appropriate type of event, city, or venue for event tickets being offered for sale, and then may be queried or prompted to select a specific event after making selections from various categories and subcategories presented via a set of interactive pull-down menus.

In one implementation, for example, a seller may be presented with a pull-down menu listing categories such as sports tickets, concert tickets, theater and arts tickets, and ticket gift certificates. If the seller selects the sports tickets category, a pull-down menu listing sports tickets such as baseball tickets, basketball tickets, football tickets, and other types of sports tickets is presented. If the seller then selects football tickets, a pull-down menu listing sports subcategories such as NFL tickets, CFL tickets, and NCAA tickets is presented. If the seller selects the NFL tickets, a pull-down menu listing ticket subcategories such as NFL regular season tickets, NFL playoff tickets, and NFL pro bowl tickets is presented. If the seller selects the NFL regular season tickets, a pull-down menu listing NFL teams is presented. Once the seller selects tickets for particular NFL team, a listing of available events including event details (e.g., team and opponent, date, time, venue name) for the team are displayed which can be sorted by event, date, and venue. The seller may then select an event from the listing of available events. It can be appreciated that appropriate sets of pull-down menus for listing categories and successive subcategories may be presented for any type of event ticket in accordance with the described embodiments.

After an event has been selected, the seller may provide the network-based system 110 with the shipping location of the tickets and verify current contact information (e.g., address and telephone phone number). The seller may provide a sale type such as a fixed price sale (e.g., set price capable of subsequent modification), a declining price sale (e.g., automatically decreasing price over time from maximum price to minimum), or an auction sale (e.g., buyers bid from a starting price during an open period with the highest bidder placing an order when the auction closes).

The seller may provide the ticket quantity for specific seats or general admission. The seller may provide the ticket quantity and may allow the quantity of offered tickets to be split among several buyers in multiples of two. The seller may provide seating and ticket details for the offered tickets such as section, row, seat numbers, and may provide other comments. In some cases, the seller may select to prevent buyers from viewing the specific seat numbers when the event listing is published by the network-based system 110.

The seller may provide the price per ticket and the ending date of the sale when the event listing is to be removed from publication. For some events, the event listing may expire three business days before the event. In certain markets, tickets may be sold on consignment and the listing may remain until the start of the event.

The seller may provide a selected payment method for the sale of the tickets such as via check, deposit to a third-party payment services account (e.g., PayPal™ account), Season Ticket Account, and/or other type of source capable of receiving funds and/or financial value, and/or donation to a third-party such as a non-profit organization or entity.

Buying Services

The buying server 136 implemented by one or more of the application servers 130 may allow a user to locate goods offered for sale via an online marketplace provided by the network-based system 110. To find goods for sale such as a single or multiple event tickets, a buyer may view active event listing published by the network-based system 110.

For example, the buyer may browse active event listings by clicking and following links for various event categories and subcategories such as sports tickets, concert tickets, theater tickets, cities, sports, teams, artists, show type (e.g., Broadway, opera, ballet, comedy), event names, and so forth. The buyer also may search for events using a search engine interface and/or one or more pull-down menus. For example, the buyer may enter one or more keywords into a search engine text entry box and view results comprising active events that satisfy the query. In various implementations, the buyer may be presented with a ticket finder screen comprising a plurality of pull-down menus for allowing the buyer to quickly formulate a search by selecting a category (e.g., sports, concert, theater, etc.), a location (e.g., city), and a number of tickets from the pull-down menus.

Once a buyer has located and selected an event, the tickets being offered for sale for the event may be presented to the buyer. In various embodiments, the user may view the details of tickets being offered for sale and the location of tickets in the event venue as described in co-pending U.S. patent application Ser. No. 11/552,782 titled "Method and System for Illustrating Where a Ticket is Located in an Event Venue," which was filed on Oct. 25, 2006 and is incorporated by reference in its entirety. In such embodiments, the buyer may be presented with an interactive event venue seat map and details of available tickets according to criteria specified by the buyer.

In one implementation, for example, after selecting an event the buyer may be presented with an interactive event venue seat map and an initial listing of all event tickets for sale. The event listings may include details such as section, row, quantity, and price and may be sorted by the buyer according to such details. The sections of the interactive event venue seat map for which tickets are available may be displayed in color while sections having no available tickets may be displayed in white.

Within the interactive event venue seat map, comparable or similarly-located (e.g., upper level) sections having available tickets may be displayed in the same color while sections having available tickets that are not comparable or similarly-located may be displayed in different colors. For example, the colors used in the sections may correspond to zones for the sections with each zone comprising several comparable or similarly-located sections. Along with the interactive event venue seat map, the buyer may be presented list comprising the different zone names and the color used for each zone. The names of zones having available tickets may be displayed in black text, while the names of zones having no available tickets may be displayed in gray text.

When presented with the interactive event venue seat map, the buyer may roll over a particular section causing a roll-over screen to appear indicating the quantity and price range of tickets available in that section. By clicking on a particular section, the event listings may be filtered to display only the event listings in the selected section along with the specific details (e.g., section, row, quantity, price) for such tickets. The buyer also may zoom-in, zoom-out, drag, and/or rotate the interactive event venue seat map.

When presented with the initial listing of all event tickets for sale, the buyer may filter the initial listing by inputting criteria such as one or more price ranges (e.g., $75-$286, $286-$349, $349-$442, $442-$559, and $559 and up). Once the buyer selects a price range, the event listings are filtered to display only the event listings in the selected price range. Additionally, the interactive event venue seat map is modified to display sections in color for which tickets are available in the selected price range.

Each event listing may include ticket attributes such as section, row, quantity, and price. Each listing also may include a link to view additional details that when clicked may display the ticket attributes along with further ticket details (e.g., seat numbers, time remaining to purchase the tickets, seller comments, delivery options), a selectively enlargeable image of the event venue for reviewing the location of the seats, and an action button for initiating purchase of the tickets.

To place an order for the tickets, the buyer may provide a delivery location, select a method of payment (e.g., credit card), confirm the transaction details (e.g., description of the tickets, delivery method, delivery location, payment amount, and method of payment), and the complete the purchase. When the buyer places the order, a confirmation e-mail is sent to the buyer, and the seller is notified of the order request via e-mail and requested to confirm the availability and delivery of the tickets. Upon receiving confirmation from the seller that the tickets have been sent, the buyer is notified as to when delivery can be expected. It can be appreciated that upon the sale of the tickets, one or more delivery options may be available depending on the locations of the buyer and the seller, the time remaining before the event, and/or the form of the tickets (e.g., physical tickets, electronic tickets).

Listing Catalog Services

The listing catalog server 138 implemented by one or more of the application servers 130 may be arranged to receive and respond to queries and/or to provide access to event information stored in the active events database 154. A query to the listing catalog server 138 may comprise, for example, a search query, web query, web feed request (e.g., RSS feed request, ATOM feed request), API request, HTTP request (e.g., Get, Post, etc.), a web form submission (e.g., XHTML/HTML form), and/or suitable request mechanism in accordance with the described embodiments. In various implementations, a query may be submitted to the listing catalog server 138 via one or more communications servers 120 from one or more client devices 104, client programs 106, a third-party server 114, and/or a third-party application 116. Queries also may be submitted to the listing catalog server 138 internally from other application servers 130 of the network-based system 110.

In one embodiment, the listing catalog server 138 may be implemented by a distributed architecture comprising a plurality of distributed indexing modules. Each of the distributed indexing modules may provide an interface for receiving queries from front-end servers such as the communications servers 120. The distributed indexing modules may store and build updatable indexes against which a query can be checked to expedite retrieval of a query result. The indexes may comprise, for example, common keywords or search terms and event IDs linked to such keywords or search terms. The distributed indexing modules also may cache common query results.

The distributed indexing modules may be arranged to receive updated indexing information brokered via a message bus from a local gatherer module. The local gatherer, in turn, may be coupled to and collect indexing information from the active events database 154. The indexing modules may update and/or filter the indexes based on the updated information received from the local gatherer module and/or information from other indexing modules.

The local gatherer module may be arranged to periodically scan items stored in the active events database 154 and obtain updated indexing information. For example, the local gatherer module may request items from the active events database 154 that have changed within a given time period. The event information stored in the active events database 154 may change frequently as new event listings for upcoming events are added and then removed when the tickets for such events listings are purchased. Furthermore, the active events database 154 may store relatively static information for an event such as category (e.g., sports, concerts, theater), as well as real-time dynamic information such as current event listings and true levels of ticket inventory. It can be appreciated that the event information maintained by the active events database 154 may be extremely dynamic especially in cases where LMS and electronic ticketing services are provided by the network-based system 110.

The listing catalog server 138 may receive and respond to the queries with event information for upcoming events that satisfy such queries. The event information may be provided locally from the listing catalog server 138, if available (e.g., cached), and/or may be retrieved by the listing catalog server 138 from the active events database 154. In various implementations, event information from the listing catalog server 138 may be communicated via one or more communications servers 120 to one or more client devices 104, client programs 106, a third-party server 114, and/or a third-party application 116. The event information from the listing catalog server 138 also may be provided internally to other application servers 130 of the network-based system 110.

Dynamic Content Management Services

The dynamic content management server 140 implemented by one or more of the application servers 130 may be arranged to provide a user with relevant and/or related dynamic content customized according to a particular context of the user. In various embodiments, the dynamic content management server 140 may be structured, arranged, and/or configured to bind dynamic information to a particular node and/or combination of nodes defining the context of the user. Exemplary nodes may include, for example, geography nodes (e.g., event cities), category nodes (e.g., sports, concerts, theater), sports nodes (e.g., baseball, football, basketball), sports subcategory nodes (e.g., professional, college), music genre nodes (e.g., jazz, rock, alternative), theater subcategory nodes (e.g., musical, comedy), ticket subcategory nodes (e.g., regular season, playoff, bowl), conference nodes, team nodes, artist nodes, theater show nodes, venue nodes, event nodes, and so forth. It can be appreciated such nodes may be arranged (e.g., hierarchically) and/or in other ways in accordance with the described embodiments.

The dynamic content management server 140 may be configured bind dynamic content such as relevant and/or related categories and subcategories, event listings for upcoming events, promotional or advertising content, UI graphics, and/or various other types of customized content to a node or combination of nodes. When navigating a web site provided by the network-based system 110, for example, the user may be presented with links for selecting from among various locations, categories, and/or subcategories and for viewing content associated with such selections. When the user makes a particular selection, the context of the user may be defined by one or more nodes associated with such selection, and the user may be presented with dynamic content customized to the context of the user.

In various embodiments, the dynamic content management server 140 may implement a front-end query tool and presentation layer to query the listing catalog server 138 according to the context of the user. In response to the query, the dynamic content management server 140 may receive dynamic content (e.g., XML content) from the listing catalog server 138 and provide the dynamic content to one or more dynamic content modules embedded in a web page presented to the user. Accordingly, the content associated with event listings may change based on the context of the user, configurable parameters, and/or available inventory.

In one example, a user selects a particular city, and the dynamic content management server 140 has bound dynamic content to a geography node associated with the particular city. Upon selection of the particular city by the user, the context of the user may be defined at least in part by the geography node of the selected city, and the user may be presented with the dynamic content that is bound to the geography node. In this case, the user may be presented with a web page including dynamic content customized for the particular city such as graphics (e.g., pictures, background) and advertising content (e.g., banner ads) for the particular city, relevant and/or related categories and subcategories (e.g., links for local sports teams, artists performing in concert in the city, theater shows playing in the city), a list of event names and dates for upcoming events in the city arranged by category, and/or other type of dynamic content that changes according to the city selected by the user.

In another example, a user selects a particular football team, and the dynamic content management server 140 has bound dynamic content to a team node associated with the particular football team. Upon selection of the team by the user, the context of the user may be defined at least in part by the team node, and the user may be presented with the dynamic content that is bound to the team node. In this case, the user may be presented with a web page including dynamic content customized for the particular team. For example, the web page presented to the user may be dynamically branded with graphics (e.g., pictures, background), advertising content (e.g., banner ads), and/or news associated with the particular team. The user also may be presented with event listings for upcoming games for the team as well as relevant and/or related categories and subcategories (e.g., links for road games, playoff games) for the team. In this implementation, the context of the user may be defined by one or more other nodes in a hierarchical path to the team node such as a category node (e.g., sports), sports nodes (e.g., football), sports subcategory node (e.g., professional), and ticket subcategory node (e.g., regular season). As such, the user may be presented with dynamic content bound to one or more of such nodes such as links to other professional football teams for which regular season tickets are available.

It can be appreciated that the embodiments are not limited to the foregoing examples and that dynamic content may be bound to a particular nodes and/or a combination of nodes for customizing that content displayed to a user based on the context of the user. Accordingly, the dynamic content management server 140 may be used to create dynamic content campaigns including a various types of static and dynamic content and to bind such campaigns to nodes or groups of nodes that define a context of the user. It also can be appreciated that a node and/or combination of nodes can be detected as a user selects one more links and/or in other ways such as when a query is submitted (e.g., text entry, selection of checkboxes, selection from a pull-down menu), a search result is returned, or in any other way in accordance with the described embodiments.

Delivery Services

The delivery server 142 implemented by one or more of the application servers 130 may arrange the delivery of goods from the seller to the buyer. For the delivery of time-sensitive goods such as a single or multiple event tickets, the network-based system 110 may determine and present delivery options that ensure that an event ticket is delivered to the buyer before an event and the costs associated with such delivery options.

In various embodiments, the network-based system 110 may coordinate the delivery of event tickets as described in co-pending U.S. patent application Ser. No. 09/867,171 titled "System and Method for Providing Logistics for a Sale of Goods," which was filed on Sep. 27, 2001 and is incorporated by reference in its entirety. In such embodiments, the network-based system 110 may automatically arrange and/or facilitate the logistics for the delivery of event tickets from the seller to the buyer.

In one implementation, for example, when the buyer places an order, available delivery options are presented to the buyer that ensure that the event tickets can be delivered before the event either to the buyer or to a pick-up location (e.g., event venue will call or an office of the network-based system 110) in proximity to the buyer. The network-based system 110 may determine all available delivery options based on the form of the tickets (e.g., physical tickets, electronic tickets), the time remaining before the event, the location of the goods, the location of the buyer, pick-up locations in proximity to the buyer, and/or the capabilities one or more couriers (e.g., air/land couriers, express couriers, local couriers or "runners") that can execute the delivery within the time remaining before the event.

When a physical ticket is to be delivered, the network-based system 110 may determine and present shipping options to the buyer. The buyer may provide a delivery or pick-up location, and the network-based system 110 may automatically determine couriers capable of ensuring delivery and present a list identifying the couriers, the available shipping methods (e.g., two day, one day, overnight, same day) for each courier, and the associated cost of each shipping method.

When a courier and shipping method is selected by the buyer, the seller may be notified and presented with a printable shipping label for the courier and logistics for providing the tickets to the courier. For example, the network-based system 110 may automatically determine the closest courier facility in proximity to the seller and may allow and arrange for the courier to retrieve the tickets. In such cases, the network-based system 110 may communicate relevant information (e.g., seller address, delivery address, pick-up day and time frame) to the courier in order to coordinate ticket retrieval. If the courier cannot service any of the selected locations at any of the selected times, the network-based system 110 may require the seller to drop off the tickets at the nearest courier facility. The seller also may select to drop off the tickets at the nearest courier facility. If the seller selects or is required to drop off the tickets, the buyer may be provided with the location of the courier facility, driving or walking directions to the courier facility, and/or a map showing the courier facility.

Upon confirmation by the seller that the tickets have been sent or picked up, the network-based system 110 may communicate delivery tracking information to the buyer and/or seller. The network-based system 110 may notify the buyer of the delivery location and expected time and date of delivery. If the delivery location is at a pick-up location such as the event venue will call or an office associated with the network-based system 110, the buyer may be provided with the pick-up location, driving or walking directions to the pick-up location, and/or a map showing the pick-up location.

To ensure delivery to the buyer before an event, a last sale time may be associated with an event listing. In some cases, for example, the last sale time for an event listing may be three business days before the event to provide sufficient transit time to ensure completion of delivery. In such cases, the event listing will expire at the last sale time. It can be appreciated, however, that both sellers and buyers may desire the last sale time to be as close to the event start time as possible in order to maximize the opportunity to make a sale and the opportunity to witness an event. Accordingly, the network-based system 110 may provide sellers and buyers with various last minute services (LMS) for maintaining an event listing and the ability to sell and purchase listed tickets right up to the start of the event.

In one implementation, for example, the network-based system 110 may allow tickets to be sold on consignment and may maintain an event listing until the start of the event. When a seller requires delivery of physical tickets for an upcoming event, the seller may select to sell the tickets using LMS provided by the network-based system 110. The seller may request LMS and provide the network-based system 110 with contact information (e.g., name, address, telephone number, e-mail address), ticket information (e.g., event name, event venue, ticket event dates, closest city to the event), and authorization to release the tickets.

In response to the LMS request, the seller may be contacted by an agent of the network-based system 110 via telephone or other contact method and provided with additional selling information. Depending on the time remaining before the event, the seller may be instructed to ship or physically deliver the tickets to an LMS center associated with the network-based system 110. Typically, the location of the LMS center will be in close proximity to the event venue. The seller also may select to physically deliver the tickets to the LMS center. When physical delivery of the ticket to the LMS center is required or selected, the seller may be provided with the location of the LMS center, driving or walking directions to the LMS center, and/or a map showing the LMS center.

Once the tickets are delivered to the LMS center, the event listing may be maintained until the start of the event and the subsequent delivery of the tickets to a buyer is handled by the network-based system 110. For example, the LMS center and/or the network-based system 110 may handle the responsibility of shipping the tickets to the buyer, delivering the tickets to the event venue will call, and/or the keeping the tickets at the LMS center until pick-up by the buyer. It can be appreciated that the LMS provided by the network-based system 110 may facilitate delivery and allow the network-based system 110 to defer the last sale time until the start of the event.

In various embodiments, the network-based system 110 also may defer the last sale time until the start of the event by providing various electronic ticketing options. In such embodiments, the network-based system 110 may provide the buyer with an electronic ticket that can be used at the event venue. Upon receiving the electronic ticket from the network-based system 110, the buyer may print out a paper copy of the electronic ticket, and the bar code of the electronic ticket can be scanned from the paper copy of the electronic ticket at the event venue. In some cases, the electronic ticket may be displayed by a mobile device of the buyer, and the bar code of the electronic ticket can be scanned from the screen of the mobile device at the event venue.

In various implementations, the network-based system 110 may communicate with an electronic ticketing system (e.g., at the event venue) to associate an electronic ticket with the buyer. For example, the network-based system 110 may instruct the ticketing system to activate new electronic tickets with new bar codes for the buyer and to deactivate the original electronic tickets and original bar codes of the seller. The new electronic tickets can be delivered to the buyer by the network-based system 110 and/or the electronic ticketing system for printing and/or display.

Alternatively or additionally, the network-based system 110 may instruct the ticketing system to associate identification and/or authorization information (e.g., credit card, swipe card, password, pin code) of the buyer with the electronic ticket and to deactivate identification and/or authorization information of the seller from the electronic ticket. Upon providing the required identification and/or authorization information to the electronic ticketing system, to a kiosk at the event venue, and/or to the network-based system 110, the buyer can print and/or display the electronic ticket.

Payment Services

The payment server 144 implemented by one or more of the application servers 130 may be arranged to effectuate and/or manage payments between buyers and sellers and to post and track financial transactions for users of the network-based system 110. Transaction information for past and pending transactions may be stored by the network-based system 110 in the transaction database 156. The payment server 144 also may provide dispute resolution mechanisms to handle payment disputes arising between transacting parties and/or fraud prevention mechanisms to prevent fraudulent transaction, unauthorized use of financial instruments, non-delivery of goods, abuse of personal information, and so forth. While the payment server 144 is shown in FIG. 1 as forming part of the networked-based system 110, it will be appreciated that the payment server 144 may form part of a third-party payment system that is separate and distinct from the network-based system 110 in alternative embodiments.

In various implementations, the payment server 144 may account for a transfer of funds and/or financial value by debiting the a source of funds and/or financial value linked to the subscriber account of the buyer and crediting a source of funds and/or financial value linked to the subscriber account of the seller. For example, the network-based system may securely communicate with one or more financial institutions such as a bank or credit card company over one or more networks 108 and arrange the transfer of funds and/or financial value from the buyer to the seller. It can be appreciated that while certain settlement mechanisms may be described for purposes of illustration, the embodiments are not limited in this regard, and a variety of settlement networks and modalities may be used in accordance with the described embodiments.

In one embodiment, after the buyer reviews and confirms an order, the account (e.g., credit card) of the buyer is verified, and the sale amount (e.g., ticket price plus delivery cost) is authorized. The seller is notified of the proposed purchase by e-mail or other notification mechanism and requested to confirm that the tickets are still available and that the transaction can be completed.

Upon receiving confirmation from the seller, the account (e.g., credit card) of the buyer is charged. Funds from the account of the buyer may be electronically transferred into a merchant account associated with the network-based system 110, and a transaction fee may be deducted. The remaining proceeds are then directed to the seller by issuing a payment in accordance with the payment method selected by the seller such as via check, deposit to a third-party payment services account (e.g., PayPal™ account), Season Ticket Account, and/or other type of source capable of receiving funds and/or financial value, and/or donation to a third-party such as a non-profit organization or entity.

It can be appreciated that the network-based system 110 may provide a "double blind" complete ticket-sale transaction without interaction between buyer and seller. Namely, the network-based system 110 may facilitate an entire ticket-sale transaction without requiring any interaction between the seller and the buyer. The network-based system 110 controls and/or facilitates the entire sale and purchase process and serves as an intermediary between the buyer and seller effectively isolating the participation of the seller in the transaction from the participation of the buyer in the transaction. Accordingly, the identity of one transacting party can remain concealed from the other.

Notification Services

The notification server 146 implemented by one or more of the application servers 130 may be arranged to generate and send various types of notifications to users of the network-based system 110. The notification server 146 may communicate with users over one or more types of networks 108 (e.g., the Internet, a WAN, a WWAN, a WLAN, a mobile telephone network, a landline telephone network, a VoIP network, etc.) via interfaces provided the communications servers 120 such as the web server 122, API server 124, and/or messaging server 126. It can be appreciated that, in some implementations, notifications may be forwarded to users via an intermediary such as an Internet Service Provider (ISP), online service provider (OSP), web-based e-mail service provide, message aggregator (e.g., SMS aggregator), mobile transaction network entity, and so forth.

The notifications may comprise messages delivered to users via e-mail, IM, SMS, MMS, video message, telephone call as well as messages delivered to the subscriber account of the user. In some cases, the notifications may provide the user with information related to various online marketplace transactions. For example, notifications may be sent to sellers for indicating the status of event listings, informing the seller of offers (e.g., auction bids) for event listings or sales of similar tickets and allowing the user to modify the prices of event listings, notifying the seller of placed orders and requesting confirmation of the availability of tickets for such orders, providing delivery instructions and requesting confirmation of delivery, tracking shipped orders, providing the status of payments, and so forth. Notifications may be sent to buyers for tracking ticket purchase transactions (e.g., active bids, auctions lost) for event listings and allowing the buyer to modify offers, confirming an order and delivery, tracking shipped orders, providing pick-up instructions and requesting confirmation of receipt, downloading and print electronic tickets, and so forth.

In accordance with various embodiments, the user may subscribe to receive customized alert notifications for upcoming events in a variety of ways such as via e-mail, IM, SMS, MMS, and/or other suitable delivery mechanism. In such embodiments, the notification server 146 may be arranged to generate and send an alert notification comprising a text message including relevant static or dynamic event information as well as an embedded hyperlink. The hyperlink may comprise a hyperlinked telephone number for allowing the user to place a telephone call to an agent of the network-based system 110 for transacting a mobile purchase. Alternatively or additionally, the hyperlink may comprise a URL or URI for navigating to the network-based system 110 for transacting the mobile purchase. Further details of such embodiments are provided in greater detail below with reference to FIGS. 2-8.

Figure 2:
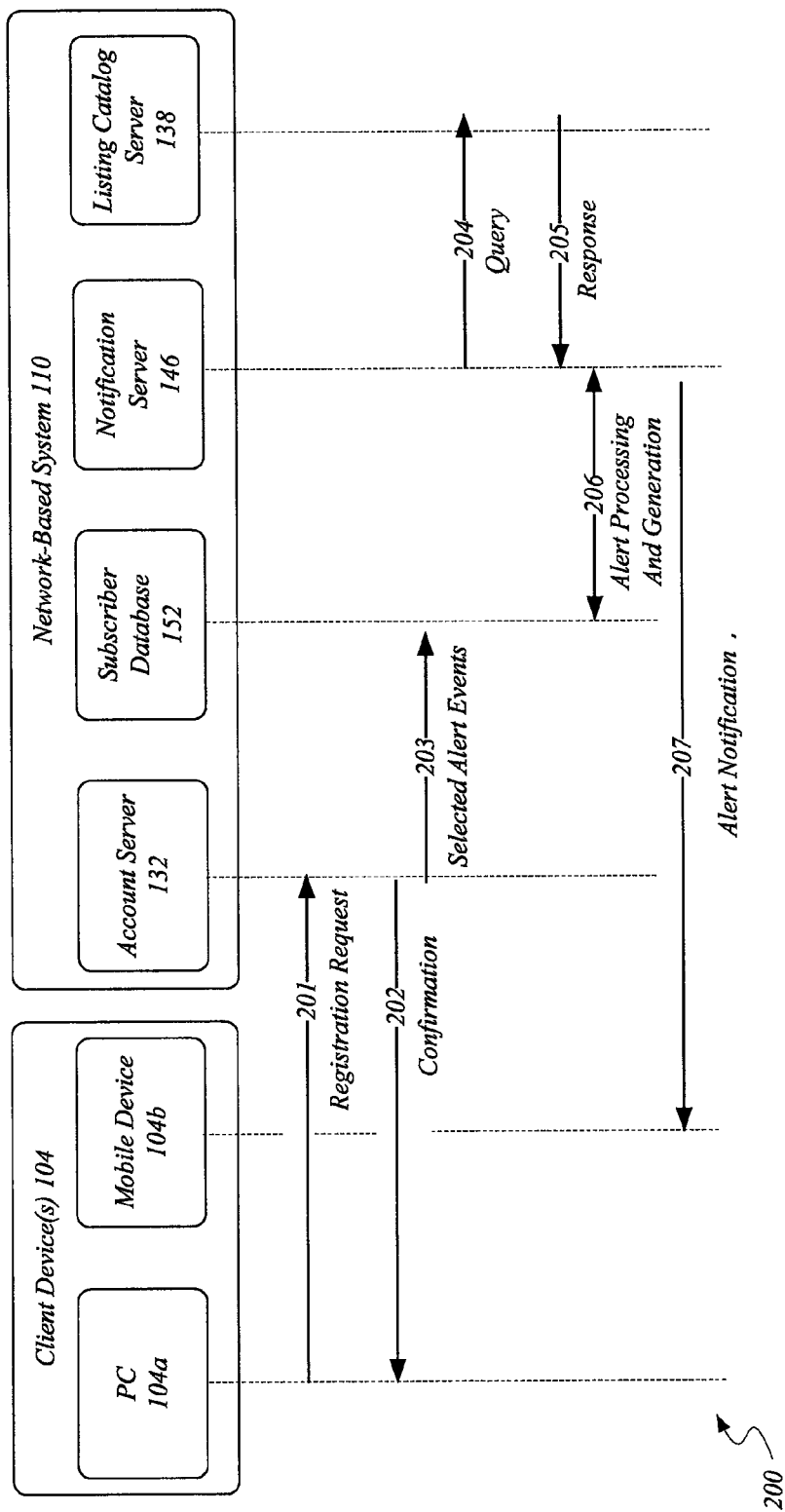
FIG. 2 illustrates a message flow among client devices and a network-based system for providing online marketplace and ticket fulfillment services in accordance with various embodiments.

FIG. 2 illustrates one embodiment of a message flow 200 suitable for practicing the various embodiments. As shown, the message flow 200 may involve the exchange of messages among client devices 104 and a network-based system 110, which may be implemented as described above. The embodiments, however, are not limited to such implementations. Furthermore, while the example illustrated in FIG. 2 includes a particular set of messages, it can be appreciated that the message flow 200 provides an exemplary implementation of the general functionality. It is to be understood that alternative or additional messages may be included and that some messages may be omitted depending on the particular implementation.

As shown, the client devices 104 may comprise a PC 104a and a mobile device 104b. In the illustrated embodiment, a user may employ the PC 104a to communicate with a network-based system 110 to request alert notifications for upcoming events that are to be received at the mobile device 104b of the user. For example, the user may employ the PC 104a to send a registration request 201 that is received by the account server 132 at the network-based system 110. In response to the registration request 201, the user may be registered with the network-based system 110 to receive one or more alert notifications, receive a confirmation 202 from the account server 132.

While in this embodiment the user employs the PC 104a during registration, it can be appreciated that the mobile device 104b also may be used to send the registration request 201 and receive the confirmation 202 in some implementations. Furthermore, while the account server 132 of the network based system 110 may handle registration of alert notifications; other servers such as the selling server 134, the buying server 136, and/or the notification server 146 may perform one or more registration operations independently of and/or in conjunction with the account server 132 in various usage scenarios.

The registration request 201 generally may comprise user information and alert event information identifying one or more upcoming events for which the user desires to receive alert notifications. The user information may include, for example, a user identifier (UserID) such as an e-mail address or username associated with a subscriber account, a telephone number (e.g., MSISDN) for the mobile device 104b, and a unique valid identifier of a mobile carrier (OperatorID) mapped from a mobile carrier identified by the user. The alert event information may include, for example, one or more upcoming events, a unique event identifier (EventID) for each upcoming alert event, and a hierarchical path list of parent identifiers (AncestorGenreIDs) indicating the browsing path (e.g., category and subcategories) traversed to reach each upcoming alert event.

In various embodiments, registration may be accomplished via HTTP request/response using an XML-based protocol such as SOAP. In one such embodiment, the registration request 201 may be implemented as follows:

```
<registration>
   <UserID>e-mail address or username</UserID>
   <MSISDN>mobile telephone number of user</MSISDN>
   <OperatorID>unique valid identifier of mobile carrier</OperatorID>
   <Events>
      <Event id="1">
         <EventID>unique event identifier</EventID>
         <AncestorGenreIDs>hierarchical path list of parentIDs
         </AncestorGenresIDs>
      </Event>
   </Events>
</registration>
```

In this embodiment, each alert event listed in the registration request 201 may be associated with a unique number (e.g., id=1, 2, 3 . . . ) used to identify the particular alert event in the confirmation 202 when providing a registration status (e.g., success or failure) for the alert event. The AncestorGenreIds may be used to link an alert event to a particular alert template used when generating the alert notification. For example, the AncestorGenreIds may be used to map an event to a particular category (e.g., sports, concerts, theater), and different alert templates may be used for different categories.

Upon registration of the user with the network-based system 110 to receive one or more alert notifications, a confirmation 202 sent in response to the registration request 201 may be implemented as follows:

```
<registration>
   <UserID> e-mail address or username </UserID>
   <Status> user registration status code</Status>
   <Events>
      <Event id="1">
         <EventStatus> alert registration status code </EventStatus>
      </Event>
   </Events>
</registration>
```

In this embodiment, the confirmation 202 may comprise the UserID (e.g., e-mail address or username) passed in the registration request 201 and the registration status (e.g., success or failure) for each alert event. The confirmation 202 also may include a user registration status code indicating whether the user has successfully registered to receive all requested alert notifications, the user has successfully registered but one or more requested alert notifications failed, or that user registration has failed such as when the mobile telephone number passed in the registration request 201 is registered. It can be appreciated that for some mobile telephone carriers, it may be necessary to send an invitation text message to the user and complete registration when the user sends an affirmative reply to the invitation.

In various usage scenarios, as the user separately or simultaneously selects multiple upcoming events, such selections may be converted into a list of EventIDs and inserted into the registration request 201. In such scenarios, the registration request 201 submitted to the network-based system 110 may comprise a unique EventID for each upcoming alert event selected by the user. It can be appreciated that a user can request to receive alert notifications for a single upcoming event or multiple upcoming events, such as all upcoming games for one or more sports teams, all upcoming events in one or more cities, and so forth.

As described above, the network-based system 110 may allow the user to set notification preferences and may provide the user with buying services. To facilitate the user when setting such notification preferences and/or when browsing available tickets for sale, the network-based system 110 may present information to and/or receive information from the user in a variety of ways such as by displaying and receiving information via GUIs (e.g., web pages, interactive screens). In various embodiments, one or more GUIs presented to the user by the network-based system 110 may allow the user to select alert events for which the user desires to receive alert notifications.

In one implementation, for example, when presented with a list of upcoming events that satisfy certain search criteria, the user may request to receive alert notifications by selecting one or more upcoming events from the list and adding the selected events as alert events. For example, GUIs presented to the user when setting notification preferences and/or browsing events may provide a search engine interface (e.g., text entry box, input fields, checkboxes, clickable hyperlinks, pull-down menus) for searching and/or filtering active events using queries, keywords, checkbox selections, menu selections, and so forth.

It can be appreciated that the embodiments are not limited in this context and that an alert notification may be requested whenever an upcoming event is presented to the user whether in response to a search or when navigating to an event listing by following one or more links. In some cases, for example, event listings presented to the user may be displayed with and/or include an alert link, clickable icon or banner, right-click functionality, and so forth for allowing the user to request an alert notification for the one or more listed events and/or a category or subcategory associated with the context of the user.

In some implementations, the user may request to receive alert notifications based on a variety of event criteria such as an event name, category, city, venue, artist, genre, team, player (e.g., starting pitcher, favorite player), theater, date range, date, number of tickets, price range, ticket attributes (e.g., zone range, zone, section range, section, row range, row, seat number range, seat number), and/or combination thereof. Accordingly, the alert information included in the registration request 201 may comprise the EventIDs as well as one or more alert conditions associated with the EventIDs. Alert notifications for such upcoming events will be generated only when such alert conditions are met.

It can be appreciated that various combinations of event criteria are possible in accordance with the described embodiments. For example, a user may request to receive an alert notification whenever a certain number of tickets for an upcoming event are available below a specified price, whenever a particular artist is performing in a certain city, whenever a certain player will be playing at a particular event venue, and so forth. A user also may request to receive alert notifications based on one or more ticket attributes. For instance, a user may request to receive an alert notification whenever a certain number of tickets for an upcoming event are available in one or more specified zones, sections, rows, and/or or seats. Additionally, event criteria may be applied alone or in combination across one or more events. A user may request, for example, to receive alert notifications when tickets in a certain row (e.g., front row) or row range (e.g., rows 1-5) within a specified zone (e.g., club infield) or section (e.g., section 224) are available for a designated team (e.g., professional baseball team) and/or for one or more games (e.g., particular opponent, rivalry game). The embodiments are not limited in the regard.

It also can be appreciated that in some cases, an upcoming event may not satisfy all event criteria specified by the user. For example, tickets for an upcoming event may be available but not within a price range specified by the user. Additionally, there may be no upcoming events that satisfy the event criteria specified by the user when there are no available tickets such as when no sellers have listed tickets for an event and/or before tickets for an event go on sale. In such cases, the user may be informed that there are no search results satisfying the search criteria and then perform a new search with relaxed search criteria. Alternatively or additionally, the network-based system 110 may automatically relax the search criteria and provide the user with one or more event listings that substantially satisfy the search criteria. The network-based system 110 then may allow the user to select to receive an alert notification for one or more upcoming events for such event listings conditioned on the complete satisfaction of the search criteria.

In some implementations, the network-based system 110 may receive the search criteria specified by the user and allow the user to select to receive an alert notification whenever an upcoming event that substantially and/or completely satisfies the search criteria is listed. For example, the user may select to receive "on sale" alert notifications when tickets that satisfy one or more preferences of the user become available. In such implementations, the network-based system 110 may provide the user with various capabilities (e.g., preference settings and options) to allow the user to receive "on sale" alert notifications for preferred tickets and to allow the user to automatically and/or optionally purchase such preferred tickets.

Once the user has registered to receive one or more alert notifications, the selected alert events 203 may be associated with the user and/or stored in the subscriber database 152. In some embodiments, the subscriber account of the user maintained by the subscriber database 152 may be updated with the EventIDs corresponding to the selected alert events 203 and/or the alert conditions and event criteria associated with the selected alert events 203. In general, when separate and/or subsequent requests are received from the user to register additional alert notifications for the mobile device 104b, the subscriber account of the user will be updated to reflect the registration of the additional alert notifications. In some cases, the user may be informed when attempting to register an alert event that is already registered. Alternatively or additionally, duplicate requests for an alert event may be ignored by the network-based system 110.

After alert notifications have been sent by the network-based system 110, the EventIDs for such events may be removed from the subscriber account of the user and/or the subscriber database 152. Alternatively or additionally, the subscriber account of the user may be updated to store copies of alert notifications which have been sent such as in a message folder or inbox of the user.

In various embodiments, the subscriber database 152 may be implemented as a relational database including a number of tables for storing records that are linked by indices and keys. The tables, in turn, may be utilized by and support various services provided by the application servers 130 including the account server 132, the listing catalog server 138, and the notification server 146. The database structure implemented by the subscriber database 152 may comprise, for example, a user table for subscriber account records, an alert event table linked to the user table for registered alert events, an alerts table linked to the alert event table for alert notifications, and/or other tables in accordance with the described embodiments.

The user table may include, for example, a UserID primary key field for uniquely identifying a user and fields for username, mobile telephone number (e.g., MSISDN), OperatorID, status, messages received this month, total messages received, and date created. The alert event table may include, for example, an AlertEventID primary key field to uniquely identify a registered alert event, a UserID foreign key field to link to the user table, and fields for EventID, processed status, template used, parent genre, category, and date created. The alert table may include, for example, an AlertID primary key to uniquely identify an alert notification, an AlertEventID foreign key field to link to the alert event table and fields for message, status, date created, processing start, processing finish, transaction identifier, processing server, and number of retries.

It can be appreciated that while information for the selected alert events 203 may be stored in the subscriber database 152 and/or a subscriber account of the user, the embodiments are not limited in this context. For example, information for the selected alert events 203 may be stored separately from the subscriber account of the user and/or in various other storage locations within the network-based system 110 such as within the account server 132, the notification server 146, or a separate database, directory, or file system configured to store user information and event information for the alert events 203.

In periodic and/or configurable intervals, the notification server 146 may send a query 204 to the listing catalog server 138 for requesting event information for upcoming events. The query 204 received by the listing catalog server 138 may comprise, for example, a search query, web query, web feed request (e.g., RSS feed request, ATOM feed request), API request, HTTP request, and/or suitable request mechanism in accordance with the described embodiments.

The listing catalog server 138 may be arranged to receive and respond to the query 204 with a response 205 including the requested event information for the upcoming events. In some embodiments, the response 205 provided by the listing catalog server 138 may include event information delivered via a web feed or other suitable delivery mechanism. While the event information may be received by the notification server 146 via a request/response mechanism, it can be appreciated that alternatively and/or additionally, the listing catalog server 138 may periodically push event information to the notification server 146 in some implementations.

In various embodiments, the query 204 may comprise starting and ending date parameters to limit the response 205 to event information for upcoming events occurring within a particular date range. In some cases, for example, the response 205 to the query 204 may include event information for all active events occurring within the next seven days for which tickets are available.

The response 205 may comprise an event identifier for each upcoming event occurring within the date range as well as a variety of other event information parameters to provide details of the upcoming events. Exemplary event information parameters that may be included in the response 205 are described below in the following table.

Event Information Parameter Table

| Event Parameter | Details |
| --- | --- |
| act_primary | Home Team Mascot |
| act_secondary | Away Team Mascot |
| active_type | 1 = active event<br>0 = inactive event |
| allowedtosell | 1 = general public allowed to sell tickets<br>0 = generatl public not allowed to sell tickets |
| ancestorGenreIds | List of parent IDs, in order of hierarchy, identifying browsing path to reach the node |
| ancestorGeoIds | List of geography IDs, in order of hierarchy, identifying browsing path to reach the geography node |
| canceled | 1 = event has been canceled<br>0 = event has not been canceled |
| channel | Name of the top level genre in the breadcrumb trail tied to the event |
| channelId | ID of the top level genre in the breadcrumb trail tied to the event |
| channelUrlPath | URL path for the top level genre in the breadcrumb trail tied to the event |
| channel_facet_str | ID and Name of the top level genre in the breadcrumb trail tied to the event |
| city | City of the event |
| date_last_modified | Time of last change to the event |
| description | Name of the event |
| eventDate_facet_str | Month and year of the event, numeric (yyyy-mm) and alpha (month, yyyy) |
| eventGeoDescription | Name of venue |
| event_date | Date and time of the event (GMT) |
| event_date_local | yyyy-mm-dd of the event |
| event_date_time | Date and local time of the event |
| event_id | Unique ID of the event |
| event_time_local | Local time of the event |
| genreUrlPath | URL path for the parent genre of the event |
| genre_parent | ID of the parent genre of the event |
| geoUrlPath | URL path for the venue of the event |
| geography_parent | ID of the parent geo of the venue |
| hide_event_date | 1 = event date hidden<br>0 = event date not hidden |
| id | ID of the event |
| last_chance | Date and time to delist the event used in place of the actual event date due to shipping rules |
| maxPrice | Highest ticket price for the event |
| maxSeatsTogether | Maximum number of successive seats that can be purchased together |
| minPrice | Lowest ticket price for the event |
| name_primary | Event match-up using team mascots (e.g., Mets vs Braves) |
| name_secondary | Full name of the away team (e.g., New York Mets) |
| spark_event_flag | Event marked as a "hot" event |
| state | State of the event |
| totalPostings | Number of actual postings for the event |
| totalTickets | Actual number of tickets listed for the event |
| venue_config_id | Configuration of the venue for the event |

It can be appreciated that, in some implementations, not all of the event information parameters included in the table may be necessary to provide alert notifications. Accordingly, when all of the event information parameters are included in the response 205, the notification server 146 may parse the response 205 and extract only those event information parameters that are needed. In the table above, for example, fields with a gray background may be parsed and discarded from the response 205. After parsing, the response 205, the notification server 146 may store the parsed version of the event information. Alternatively, the query 204 and/or the response 205 may be configured to request and respond with only those event information parameters necessary to provide alert notifications. It also can be appreciated that the response 205 may include different event information parameters and/or additional event information parameters that described in the table.

The notification server 146 may store the some or all of the event information received in the response 205 and then process the event information in periodic and/or configurable intervals. In some implementations, the notification server 146 may update the stored event information with new event information received via subsequent communications from the listing catalog server 138. For example, the stored event information may be updated to include additional upcoming events or to reflect event details that have changed.

In various embodiments, the notification server 146 may automatically process the event information by determining whether an active event identified in the response 205 occurs within a certain time threshold. For example, the notification server 146 may determine whether the difference between the current time and the starting time is less than the threshold amount of time for each active event. It can be appreciated that the time threshold can be configured to schedule and control a default amount of time when alert notifications for upcoming events are sent, such a certain number of hours (e.g., 72 hours) before the event takes place.

After determining that an active event is occurring within the time threshold, the notification server 146 may communicate with the subscriber database 152 for performing alert processing and generation 206. In various implementations, the alert processing and generation 206 may involve determining whether any user has registered to receive an alert notification for an upcoming event occurring within the time threshold. For example, the notification server 146 may check the EventID for the upcoming event against EventIDs of all alert events (including the selected alert events 203) registered by users and stored in the subscriber database 152.

The alert processing and generation 206 also may involve determining whether an alert notification for an upcoming event has already been processed and/or sent to the user. For example, when the EventID for the upcoming event matches an EventID of an alert event registered by a user, the notification server 146 may determine whether an alert notification for the upcoming event has already been processed for the user. If an alert notification has been sent to the user, further processing may be discontinued in some implementations. In other implementations, the notification server 146 may determine whether a subsequent notification alert is to be sent. For example, if an alert notification was sent previously via an e-mail message, a subsequent alert notification may be sent via an SMS message. A subsequent alert notification of the same type also may be sent to the user as a reminder. In such cases, however, the subsequent alert notification may be tailored as a reminder message or to include different content than the prior alert notification.

If an alert notification has not been processed for an upcoming event having an EventID matching an EventID associated with the user and/or a subsequent alert notification is to be sent, further alert processing and generation 206 is performed. In various implementations, the notification server 146 may determine whether the user has specified alert conditions for generating an alert notification and, if so, whether the event information of the upcoming event satisfies such alert conditions. For example, if the minimum price of available tickets is not within a price range specified by the user and/or the number of tickets available is lower than the number of tickets requested by the user, an alert notification will not be generated.

In some cases, the notification server 146 also may determine if a user has already purchased tickets for the upcoming event and, if so, how many and when the tickets were purchased. It also may be determined whether the purchase of such tickets occurred prior to or after the user registered to receive an alert notification for the upcoming event. If it is determined that a user registered to receive an alert notification for the upcoming event after making a purchase, an alert notification for the event will be sent. An alert notification also will be if the user registered to receive an alert notification for a number of tickets greater than the number of tickets already purchased by the user. If the notification server 146 determines conclusively that a user has already purchased the tickets for which the user registered the alert notification, the notification server 146 may discontinue further processing or may send an alert notification tailored for such case. For example, the alert notification may include content recognizing the fact that the user has purchased tickets (e.g., Thank you message, Have a Good Time message) and informing the user that more tickets are available.

Once it is determined that an alert notification 207 is to be generated and sent to a particular user, the notification server 146 may retrieve user information (e.g., mobile telephone number of the mobile device 104b) and event information (e.g., static or dynamic content) for generating the alert notification 207. In various embodiments, the content of the alert notification 207 may be configured automatically by the notification server 146 and/or by an administrator of the network-based system 110.

In some implementations, for example, the alert notification 207 may be generated using a predefined alert notification template. The alert notification template may be selected, for example, according to an event category (e.g., sports, concerts, theater) linked to a registered alert event (e.g., category field in alert event table) and/or an upcoming event (e.g., category parameter). The templates may be stored in a table that includes, for example, a TemplateID primary key field to uniquely identify the alert notification template and fields for title, text, category, and target split. When the alert notification 207 is generated, a TemplateID matched to a particular category may be selected. To improve marketing efforts, a particular category may be associated with a plurality of TemplateIDs. Each template, in turn, may be used for a certain percentage of a target group. A history of all templates may be maintained, and processed alert notifications may be associated with a TemplateID. By tracking which templates ultimately result in ticket purchases, the content and/or selection of templates may be modified and/or optimized to increase sales.

In various embodiments, the templates for alert notifications can be created, managed, and/or modified by an administrator of the network-based system 110. For example, an administrator may view a list of categories, the number of alert events associated with each category, and the number of alert notifications that have been sent for each category. By selecting a particular category, the administrator can create, view, and/or modify the alert notification templates associated with the particular category and can preview alert notifications to be sent to users. Each alert notification template may comprise, for example, static text and placeholders (e.g., fields) for embedding dynamic values when generating alert notifications.

When the alert notification 207 is generated, dynamic event information for the upcoming event may be retrieved and embedded into the alert notification 207. The dynamic event information may comprise, for example, event description, date and time of the event, location of the event (e.g., city or venue), current number of available tickets, event criteria or alert conditions specified by the user, and/or any other type of relevant or related dynamic content in accordance with the described embodiments.

It can be appreciated that the amount of content contained in the alert notification 207 may depend on the type of message to be communicated. For example, SMS messages generally may include only up to 160 characters including spaces. For messages types without such size limitations, alert notifications can include a variety of dynamic content including multimedia objects (e.g., images, video, sounds, music), advertisements, static or interactive maps (e.g., city map showing event venues or pick-up locations, event venue seat map), delivery options, and/or other relevant or related content.

In accordance with various embodiments, the alert notification 207 may be sent by the notification server 146 to the mobile device 104b of the user. In one of such embodiments, for example, the alert notification 207 may comprise a text message (e.g., SMS text message) to be communicated to the mobile device 104b over a mobile telephone network via a messaging interface provided by the messaging sever 126. In some implementations, the alert notification 207 may be forwarded to the mobile device 104b via an intermediary such as a message aggregator (e.g., SMS aggregator), mobile transaction network entity, and so forth. In such cases, the notification server 146 may maintain an open connection to the intermediary for the runtime of the alert processing, process alert notifications in bulk, and receive status updates from the intermediary for determining whether the alert notification 207 has been successfully processed, is in process, or has failed.

The alert notification 207 may comprise a text message including static and/or dynamic event information for the upcoming event and a hyperlink for allowing the user to transact a mobile purchase. The hyperlink may comprise, for example, a hyperlinked telephone number for allowing the user to place a telephone call to an agent of the network-based system 110 for transacting a mobile purchase. The agent of the network-based system 110 may be a customer service representative and/or an IVR system. By communicating with the agent, the user may order and purchase tickets for the upcoming event identified by the alert notification 207. In some cases, the user also may inquire as to the availability of additional tickets and/or different tickets than those identified by the alert notification 207. For example, if the alert notification 207 was associated with an alert condition such as a specified number of tickets (e.g., 2 tickets), price range (e.g., below $25), and/or date range (e.g., this week), the user may ask for details regarding additional tickets, better tickets, or tickets to a similar event (e.g., different game of the same series) and may purchase such tickets in addition to and/or instead of those identified by the alert notification 207.

Alternatively or additionally, the hyperlink included in the text message may comprise a URL or URI for navigating to the network-based system 110 for transacting the mobile purchase. By clicking on the hyperlink, the user may be directed to a web interface the network-based system 110 and display a webpage using the mobile device 104b. In various implications, the content of the webpage displayed by the user may be configured by the network-based system 110 in accordance with the web browsing capabilities of the mobile device 104b.

The web page displayed by the mobile device 104b in response to clicking the URL or URI may comprise, for example, event information for the upcoming event identified by the alert notification 207 such as the name of the event, the date and time of the event, the event venue, event listings including ticket attributes (e.g., section, row, quantity, price), a link to purchase electronic tickets, and/or a link to view additional details. By clicking the link to purchase electronic tickets, the user may initiate a purchase and receive the electronic tickets at the mobile device 104b and/or the PC 104a for printing. By clicking the link to view additional details, a subsequent web page may be displayed by the mobile device 104b including ticket attributes along with further ticket details (e.g., seat numbers, time remaining to purchase the tickets, seller comments, delivery options), a selectively enlargeable image of the event venue for reviewing the location of the seats, and an action button for initiating purchase of the tickets. In some cases, one or more of the web pages displayed by the mobile device 104b may include a link to view delivery options such as a location of, driving or walking directions to, and/or a map showing a pick-up location.

As described above, the network-based system 110 may communicate with users over one or more types of networks 108 via interfaces provided the communications servers 120 and provide various services to users such as online marketplace and ticket fulfillment services via the application servers 130 and databases 150. When servicing a user, the network-based system 110 may present information to and/or receive information from the user in a variety of ways such by displaying and receiving information via GUIs (e.g., web pages, interactive screens), sending and receiving messages (e.g., e-mail, IM, SMS, MMS, video message), placing and/or receiving telephone calls (e.g., landline, mobile, VoIP, IVR calls), and so forth.

FIG. 3 illustrates a representation of a web page 300 hosted by the network-based system 110 for providing online marketplace and ticket fulfillment services in accordance with various embodiments. With reference to FIGS. 1 and 2, the web page 300 may be a web browser UI displayed by one or more client devices 104 (e.g., PC 104a or mobile device 104b) for allowing the user to subscribe to receive customized alert notifications. It can be appreciated that the embodiments are not limited in the context and that interfaces other than the web page 300 may be used.

As shown, the web page 300 comprises an alert preferences area 302 including checkboxes for allowing the user to subscribe to receive one or more types of alert notifications for events, teams, artists and/or venues. The web page 300 also comprises a search engine interface including pull-down menus for selecting event criteria such as location, category, date range, number of tickets, and price range. By conducting a search, the user may be presented with event listings that satisfy the selected search criteria and request to receive alert notifications by selecting one or more upcoming events from the event listings and adding the selected events as alert events. In this exemplary representation, the user has subscribed to receive e-mail alerts and SMS text message alerts for events. When adding an event from the event listings, the user may select to receive an e-mail alert and/or an SMS text message alert for the added event.

Figure 4:
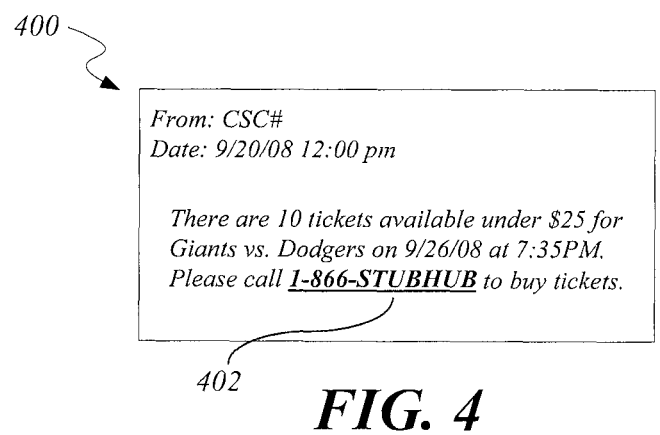
FIG. 4 illustrates a representation of a text message sent by the network-based system for providing online marketplace and ticket fulfillment services in accordance with various embodiments.

FIG. 4 illustrates a representation of a text message 400 sent by the network-based system 110 for providing online marketplace and ticket fulfillment services in accordance with various embodiments. With reference to FIGS. 1 and 2, the text message 400 may comprise the alert notification 207 displayed by the mobile device 104b of the user. It can be appreciated that the embodiments are not limited in the context and that messages other than the text message 400 may be used.

As shown, the text message 400 comprises an SMS text message communicated over a mobile telephone network and associated with a common short code number of the network-based system 110. The text message includes static and dynamic event information for an upcoming event and a hyperlinked telephone number 402 for allowing the user to place a telephone call to an agent (e.g., customer service representative and/or an IVR system) of the network-based system 110 for transacting a mobile purchase in accordance with the described embodiments.

Figure 5:
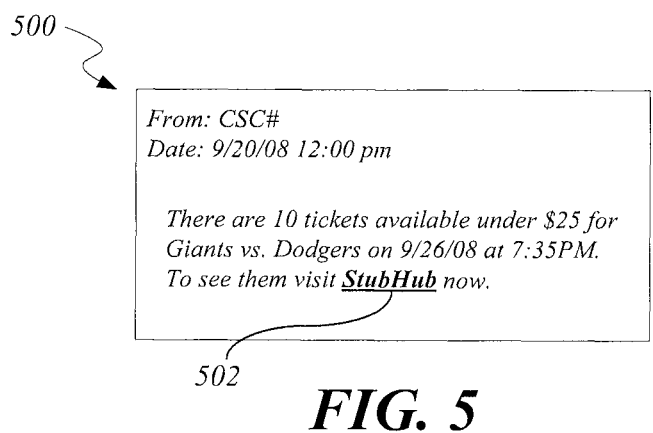
FIG. 5 illustrates a representation of a text message sent by the network-based system for providing online marketplace and ticket fulfillment services in accordance with various embodiments.

FIG. 5 illustrates a representation of a text message 500 sent by the network-based system 110 for providing online marketplace and ticket fulfillment services in accordance with various embodiments. With reference to FIGS. 1 and 2, the text message 500 may comprise the alert notification 207 displayed by the mobile device 104b of the user. It can be appreciated that the embodiments are not limited in the context and that messages other than the text message 500 may be used.

As shown, the text message 500 comprises an SMS text message communicated over a mobile telephone network and associated with a common short code number of the network-based system 110. The text message includes static and dynamic event information for an upcoming event and a URL hyperlink 502 for navigating to the network-based system 110 for transacting a mobile purchase in accordance with the described embodiments.

Figure 6:
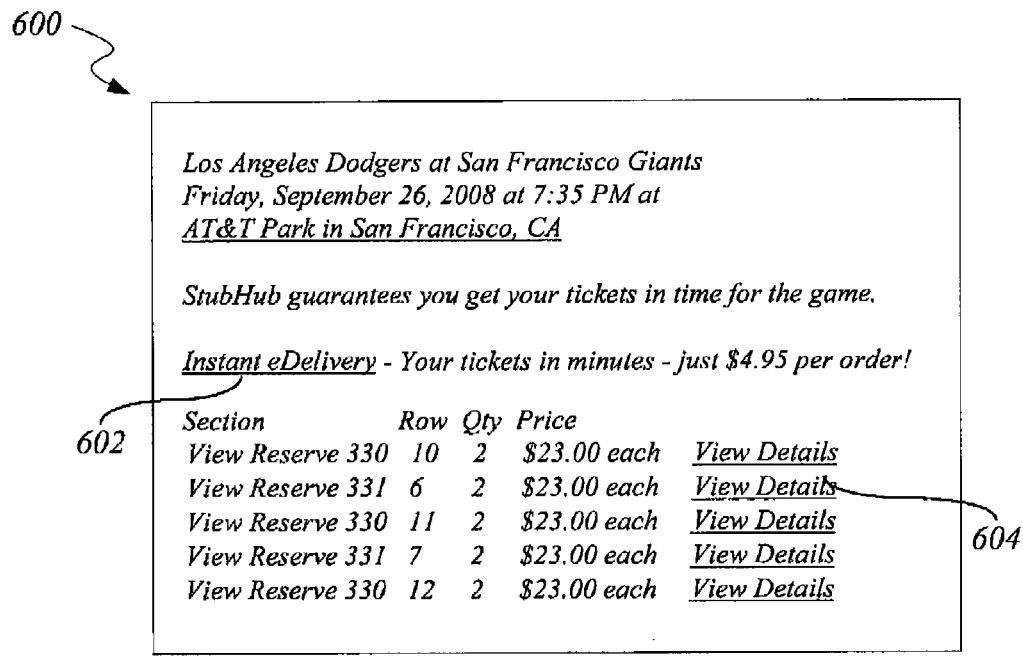
FIG. 6 illustrates a representation of a web page displayed by a client device for providing online marketplace and ticket fulfillment services in accordance with various embodiments.

FIG. 6 illustrates a representation of a web page 600 for providing online marketplace and ticket fulfillment services in accordance with various embodiments. With reference to FIGS. 1 and 2, the web page 600 may be a web browser UI displayed by the mobile device 104b. It can be appreciated that the embodiments are not limited in the context and that interfaces other than the web page 600 may be used.

In various implementations, the web page 600 may be displayed in response to the user clicking a URL or URI hyperlink (e.g., URL hyperlink 502) included in a text message (e.g., text message 500) and may include event information for an upcoming event identified by the alert notification 207. As shown, the web page 600 comprises the name of the event, the date and time of the event, the event venue, event listings including ticket attributes (e.g., section, row, quantity, price), a link 602 to purchase electronic tickets, and/or a link 604 to view additional details for a particular event listing. By clicking the link 602 to purchase electronic tickets, the user may initiate a purchase and receive the electronic tickets at the mobile device 104b and/or the PC 104a for printing.

Figure 7:
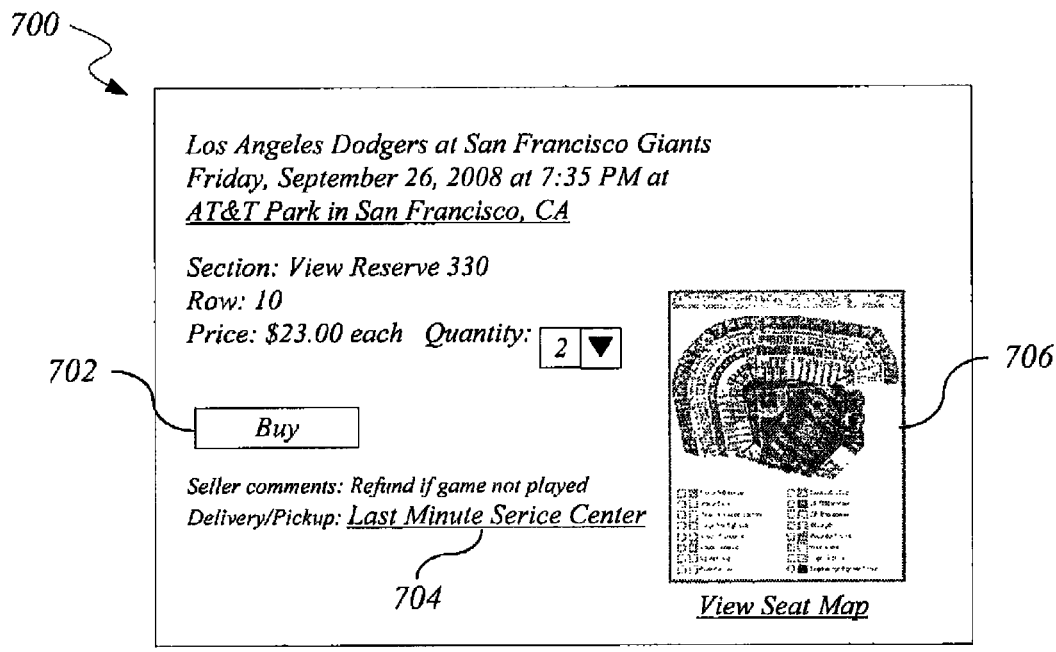
FIG. 7 illustrates a representation of a web page displayed by a client device for providing online marketplace and ticket fulfillment services in accordance with various embodiments.

FIG. 7 illustrates a representation of a web page 700 for providing online marketplace and ticket fulfillment services in accordance with various embodiments. With reference to FIGS. 1 and 2, the web page 700 may be a web browser UI displayed by the mobile device 104b. It can be appreciated that the embodiments are not limited in the context and that interfaces other than the web page 700 may be used.

In various implementations, the web page 700 may be displayed in response to the user clicking a link (e.g., 604) to view additional details about a particular event listing in a web page (e.g., web page 600). As shown, the web page 700 comprises the name of the event, the date and time of the event, the event venue, ticket attributes (e.g., section, row, quantity, price), and an action button 702 for initiating purchase of the tickets. The web page 700 also comprises a link 704 to view delivery options (e.g., location of a LMS center, driving or walking directions to the LMS center, and/or a map showing the LMS center) and an enlargeable event venue seat map 706 for reviewing the location of the seats.

Operations for the above-described embodiments may be further described with reference to one or more logic flows. It may be appreciated that the representative logic flows provide an exemplary implementation of the general functionality and do not necessarily have to be executed in the order presented, or in any particular order, unless otherwise indicated. It also can be appreciated that the logic flows may be implemented by a hardware element, a software element executed by a computer, or any combination thereof.

Figure 8:
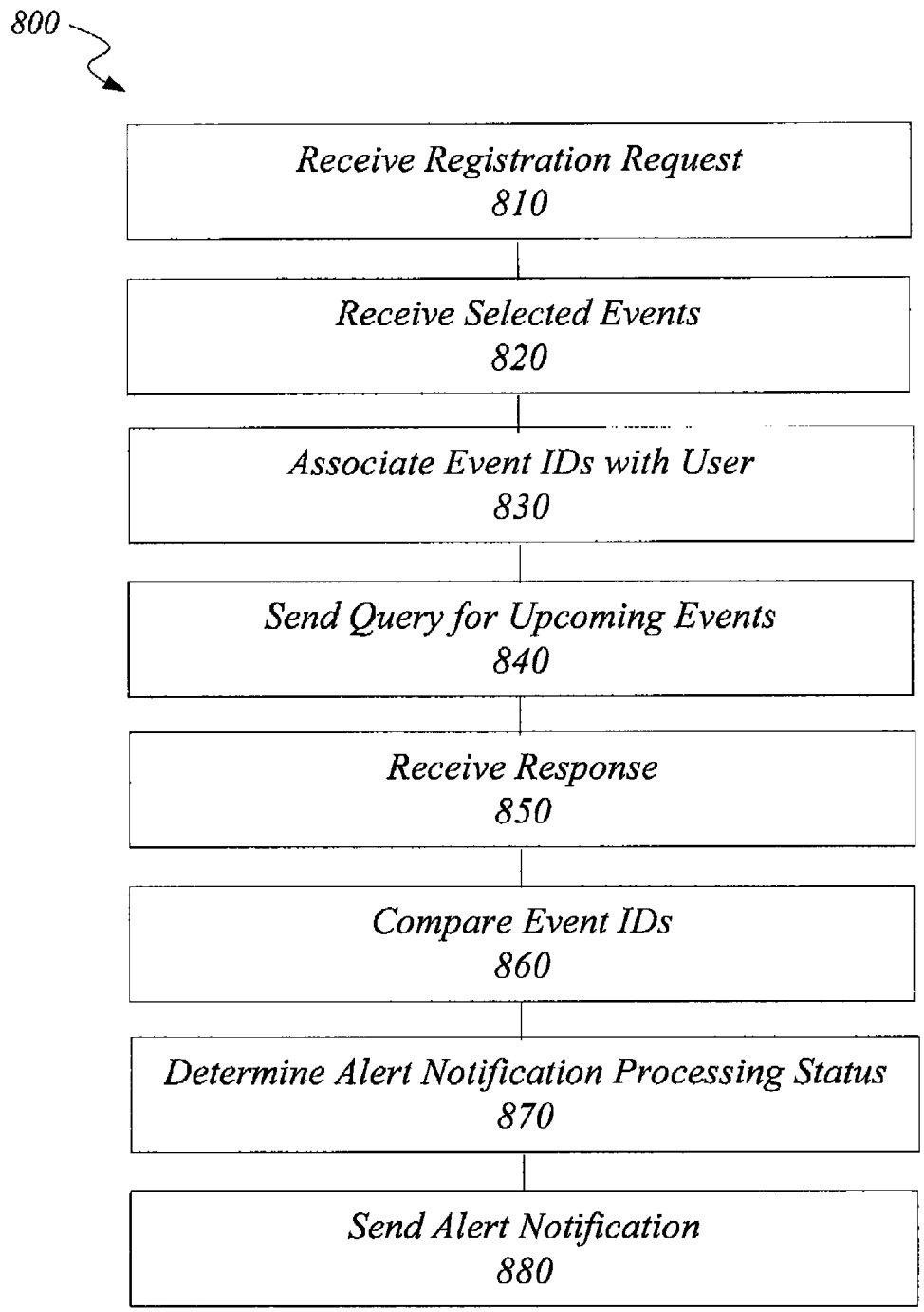
FIG. 8 illustrates a logic flow including operations performed by a network-based system to provide online marketplace and ticket fulfillment services in accordance with various embodiments.

FIG. 8 illustrates a logic flow 800 including operations for providing online marketplace and ticket fulfillment services in accordance with various embodiments. The logic flow 800 may be performed by various systems (e.g., network-based system 110) and/or devices and may be implemented as hardware, software, firmware, and/or any combination thereof, as desired for a given set of design parameters or performance constraints. For example, the logic flow 800 may be implemented by a logic device (e.g., computing device, server, and/or processor) and/or logic (e.g., computer executable program instructions) to be executed by a logic device.

As shown, the logic flow 800 may comprise receiving a registration request from a user to receive alert notifications for upcoming events (block 810). In various embodiments, the registration request may be received at a network-based system and may comprise a telephone number for a mobile device of the user. The logic flow 800 may comprise receiving one or more upcoming events selected by the user (block 820) and associating the user with one or more event identifiers corresponding to the one or more upcoming events selected by the user (block 830).

The logic flow 800 comprise sending a query for upcoming events occurring within a date range (block 840) and receiving a response to the query comprising an event identifier for each upcoming event occurring within the date range (block 850). The logic glow 800 may comprise comparing each event identifier for each upcoming event to the one or more event identifiers associated with the user (block 860), determining whether an alert notification has been processed for an upcoming event having an event identifier matching an event identifier associated with the user (block 870), and sending an alert notification to the mobile device of the user for an upcoming event having an event identifier matching an event identifier associated with the user if an alert notification has not been processed (block 880).

In various embodiments, the alert notification may comprise a text message including static and dynamic event information (e.g., number of available tickets, and a hyperlink for allowing the user to transact a mobile purchase. The hyperlink may comprise a hyperlinked telephone number for allowing the user to place a telephone call to an agent (e.g., a customer service representative and/or an IVR system) of the network-based system. Alternatively or additionally, the hyperlink may comprise a URL or a URI for navigating to the network-based system for transacting the mobile purchase.

It can be appreciated that while the logic flow 800 may illustrate a certain sequence of steps, other sequences of steps may also be performed in accordance with the described embodiments. Moreover, some individual steps of the logic flow 800 may include multiple sub-steps that may be performed in various sequences as appropriate to the individual step. Furthermore, additional steps may be added or some steps may be removed depending on the particular implementation.

In various embodiments, one or more operations of the logic flow 800 may comprise, or be implemented as, executable computer program instructions. The executable computer program instructions may be implemented by software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable programming language in accordance with the described embodiments.

In various embodiments, one or more operations of the logic flow 800 may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

Although some embodiments may be illustrated and described as comprising exemplary functional components or modules performing various operations, it can be appreciated that such components or modules may be implemented by one or more hardware components, software components, firmware components, and/or combination thereof.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

We claim:

1. A system comprising:
   a memory storing alert notification templates for different event categories; and
   one or more hardware processors in communication with the memory and configured to perform operations comprising:
   performing a first search for one or more upcoming events using one or more event search criteria;
   determining that the first search using the one or more event search criteria returns no upcoming events;
   in response to the determining, automatically reducing the one or more event search criteria;
   performing a second search for one or more upcoming events that substantially satisfy the one or more event search criteria using the reduced relaxed one or more event search criteria;
   determining an upcoming event to suggest to a user based on the second search using the reduced one or more search criteria;
   selecting an alert notification template from the alert notification templates according to an event category of the upcoming event; and
   sending an alert notification for the upcoming event to a mobile device of the user using the alert notification template, the alert notification comprising a message including a hyperlink for allowing the user to transact a mobile purchase for the upcoming event through the mobile device.

2. The system of claim 1, wherein the alert notification template is selected from a plurality of alert notification templates for the event category.

3. The system of claim 2, wherein a first one of the plurality of alert notification templates is sent to a first percentage of a target group and a second one of the plurality of alert notification templates is sent to a second percentage of the target group.

4. The system of claim 3, wherein the operations further comprise modifying the first one of the plurality of alert notification templates when the second one of the plurality of alert notification templates generates more ticket purchases than the first one of the plurality of alert notification templates.

5. The system of claim 1, wherein the different event categories comprise sports, concerts, and theater.

6. The system of claim 1, wherein the alert notification is sent as a text message.

7. The system of claim 1, wherein the one or more event search criteria are received from the user.

8. The system of claim 1, wherein the further comprise:
   determining that an active event is occurring within a time threshold; and
   communicating an event notification for the active event to the mobile device of the user when the active event is occurring within the time threshold.

9. A method comprising:
   performing a first search for one or more upcoming events using one or more event search criteria;
   determining that the first search using the one or more event search criteria returns no upcoming events;
   in response to the determining, automatically reducing the one or more event search criteria;
   performing a second search for one or more upcoming events that substantially satisfy the one or more event search criteria using the reduced one or more event search criteria;
   determining, electronically by a processor, an upcoming event to suggest to a user based on the second search using the reduced one or more event search criteria;
   selecting an alert notification template from a plurality of stored alert notification templates based on an event category of the upcoming event; and
   communicating, electronically, an alert notification for the upcoming event to a mobile device of the user using the alert notification template, the alert notification comprising a message including a hyperlink for allowing the user to transact a mobile purchase for the upcoming event through the mobile device.

10. The method of claim 9, wherein the alert notification template is selected from a plurality of alert notification templates for the event category.

11. The method of claim 9, wherein the hyperlink comprises a hyperlinked telephone number.

12. The method of claim 9, wherein the hyperlink comprises at least one of a uniform resource locator (URL) and a uniform resource identifier (URI).

13. The method of claim 9, wherein the alert notification template comprises static text and placeholders for embedding dynamic values when generating the alert notification.

14. The method of claim 9, further comprising retrieving and embedding dynamic event information for the upcoming event when the alert notification is generated.

15. The method of claim 14, wherein the dynamic event information comprises at least one of an event description, a date and time of the upcoming event, a location of the upcoming event, and a current number of available tickets for the upcoming event.

16. The method of claim 9, further comprising:
   determining that an active event is occurring within a time threshold; and
   communicating an event notification for the active event to the mobile device of the user when the active event is occurring within the time threshold.

17. A non-transitory computer-readable storage medium comprising executable computer program instructions to enable a computing system to:
   access or receive event search criteria for a user;
   perform a first search for one or more upcoming events using the event search criteria;
   determine that the first search using the event search criteria returns no upcoming events;

in response to the determining, automatically reduce the event search criteria;

perform a second search for one or more upcoming events that substantially satisfy the event search criteria using the reduced event search criteria;

determine, from the second search using the reduced event search criteria, an upcoming event to suggest to the user;

select an alert notification template according to an event category of the upcoming event; and send an alert notification for the upcoming event to the mobile device of the user over a mobile telephone network using the alert notification template, the alert notification comprising a message including a hyperlink for allowing the user to transact a mobile purchase for the upcoming event.

18. The non-transitory computer-readable storage medium of claim 17, wherein the alert notification template is selected from a plurality of alert notification templates for the event category.

19. The non-transitory computer-readable storage medium of claim 17, wherein the alert notification is sent as a text message.

20. The non-transitory computer-readable storage medium of claim 17 further comprising executable computer program instructions to enable the computing system to:

determine that an active event is occurring within a time threshold; and communicate an event notification for the active event to the mobile device of the user when the active event is occurring within the time threshold.

\* \* \* \* \*